(12) United States Patent
Poer

(10) Patent No.: US 10,139,030 B2
(45) Date of Patent: Nov. 27, 2018

(54) CURED-IN-PLACE PIPE UNIT AND REHABILITATION

(71) Applicant: Rush Sales Company, Inc., Odessa, TX (US)

(72) Inventor: Jim Joseph Poer, Midland, TX (US)

(73) Assignee: Rush Sales Company, Inc., Odessa, TX (US)

( * ) Notice: Subject to any disclaimer, the term of this patent is extended or adjusted under 35 U.S.C. 154(b) by 0 days.

(21) Appl. No.: 15/612,046

(22) Filed: Jun. 2, 2017

(65) Prior Publication Data

US 2017/0350549 A1 Dec. 7, 2017

Related U.S. Application Data

(60) Provisional application No. 62/458,320, filed on Feb. 13, 2017, provisional application No. 62/344,482, filed on Jun. 2, 2016.

(51) Int. Cl.
| | |
|---|---|
| *F16L 55/165* | (2006.01) |
| *F16L 1/26* | (2006.01) |
| *F16L 1/00* | (2006.01) |
| *F16L 1/038* | (2006.01) |
| *F16L 55/18* | (2006.01) |

(52) U.S. Cl.
CPC .......... *F16L 55/1654* (2013.01); *F16L 55/18* (2013.01)

(58) Field of Classification Search
CPC ... F16L 1/00; F16L 1/038; F16L 1/036; F16L 1/26; F16L 55/18; F16L 55/165; E03F 3/06; E03F 2003/065

USPC .. 405/54.1, 155, 183.5, 184.1, 184.2, 184.3, 405/184.4; 138/97, 98; 166/55.6, 55.7, 166/55.8

See application file for complete search history.

(56) References Cited

U.S. PATENT DOCUMENTS

| | | | | |
|---|---|---|---|---|
| 3,294,607 | A * | 12/1966 | Rothermel | B29C 49/20 156/144 |
| 3,758,361 | A * | 9/1973 | Hunter | B29C 49/26 138/109 |
| 3,927,164 | A * | 12/1975 | Shimabukuro | B29D 23/001 156/247 |
| 4,009,063 | A * | 2/1977 | Wood | B29C 53/36 156/71 |
| 4,064,211 | A * | 12/1977 | Wood | B29C 63/0069 138/140 |
| 4,135,958 | A * | 1/1979 | Wood | B29C 63/0021 118/408 |
| 4,182,262 | A * | 1/1980 | Everson | B29C 63/36 118/408 |
| 4,273,605 | A * | 6/1981 | Ross | B08B 9/047 138/140 |

(Continued)

FOREIGN PATENT DOCUMENTS

DE 212006000006 6/2007

*Primary Examiner* — Benjamin F Fiorello
*Assistant Examiner* — Edwin J Toledo-Duran
(74) *Attorney, Agent, or Firm* — Oathout Law Firm; Mark A. Oathout

(57) ABSTRACT

Apparatus and methodology for installing and curing of "Cured-in-place" pipe, mounted unitarily as a mobile unit having a pressurization system such as a low pressure-high volume blower system, a low-NOx burner system, a power system such as a hydraulic reservoir, electrical and/or motor driven, and a burner chamber system.

16 Claims, 22 Drawing Sheets

(56) References Cited

U.S. PATENT DOCUMENTS

| | | | | |
|---|---|---|---|---|
| 4,350,548 A * | 9/1982 | Zenbayashi | B29B 13/024 | 138/124 |
| 4,366,012 A * | 12/1982 | Wood | F16L 55/1651 | 138/140 |
| 4,434,115 A * | 2/1984 | Chick | B29C 63/36 | 138/140 |
| 4,456,401 A * | 6/1984 | Williams | B29C 63/0021 | 138/97 |
| 4,576,205 A * | 3/1986 | Morinaga | F16L 55/1656 | 138/124 |
| 4,581,085 A * | 4/1986 | Wood | B29C 63/36 | 138/97 |
| 4,637,754 A * | 1/1987 | Wood | B29C 63/34 | 156/287 |
| 4,647,251 A * | 3/1987 | Gale | G02B 6/4459 | 248/49 |
| 4,668,125 A * | 5/1987 | Long, Jr. | E03F 3/06 | 138/141 |
| 4,686,126 A * | 8/1987 | Hyodo | F16L 11/02 | 138/97 |
| 4,714,095 A * | 12/1987 | Muller | F16L 55/1656 | 138/105 |
| 4,752,431 A * | 6/1988 | Knowles | B29C 53/20 | 138/140 |
| 4,770,562 A * | 9/1988 | Muller | F16L 55/1651 | 138/97 |
| 4,776,370 A * | 10/1988 | Long, Jr. | F16L 55/1651 | 138/109 |
| 4,777,984 A * | 10/1988 | Storah | F16L 55/1654 | 138/98 |
| 4,778,553 A * | 10/1988 | Wood | F16L 55/1651 | 138/141 |
| 4,786,345 A * | 11/1988 | Wood | F16L 55/165 | 156/156 |
| 4,836,715 A * | 6/1989 | Wood | F16L 55/1656 | 138/98 |
| 4,883,557 A * | 11/1989 | Morinaga | F16L 55/1651 | 138/98 |
| 4,936,707 A * | 6/1990 | Shishkin | E02F 5/101 | 285/235 |
| 4,950,356 A * | 8/1990 | Grace | F16L 55/1645 | 118/105 |
| 4,980,116 A * | 12/1990 | Driver | F16L 55/1604 | 138/98 |
| 5,002,438 A * | 3/1991 | Strong | E02D 29/12 | 405/133 |
| 5,044,405 A * | 9/1991 | Driver | F16L 55/1651 | 138/98 |
| 5,108,533 A * | 4/1992 | Long, Jr. | B29C 63/36 | 156/287 |
| 5,112,211 A * | 5/1992 | LeDoux | B29C 67/0014 | 425/384 |
| 5,154,936 A * | 10/1992 | Driver | B29C 63/36 | 118/DIG. 10 |
| 5,322,653 A * | 6/1994 | Muller | B29C 63/28 | 138/97 |
| 5,329,063 A * | 7/1994 | Endoh | B29C 53/48 | 138/97 |
| 5,374,174 A * | 12/1994 | Long, Jr. | B29C 63/36 | 156/287 |
| 5,386,669 A * | 2/1995 | Almeida | E02D 29/12 | 220/560.01 |
| 5,388,616 A * | 2/1995 | Muller | F16L 55/1651 | 138/104 |
| 5,393,481 A * | 2/1995 | Wood | F16L 55/1651 | 156/287 |
| 5,395,472 A * | 3/1995 | Mandich | B29C 63/343 | 138/114 |
| 5,407,630 A * | 4/1995 | Smith | B29C 47/0004 | 156/287 |
| 5,411,060 A * | 5/1995 | Chandler | B29C 63/34 | 138/103 |
| 5,451,351 A * | 9/1995 | Blackmore | B29C 63/0069 | 138/97 |
| 5,520,484 A * | 5/1996 | Kamiyama | B29C 63/36 | 138/97 |
| 5,546,992 A * | 8/1996 | Chick | F16L 9/18 | 138/104 |
| 5,597,353 A * | 1/1997 | Alexander, Jr. | B29C 63/36 | 118/254 |
| 5,653,555 A * | 8/1997 | Catallo | B29C 63/34 | 156/287 |
| 5,706,861 A * | 1/1998 | Wood | F16L 55/163 | 138/97 |
| 5,736,166 A * | 4/1998 | Polivka | B29C 63/36 | 138/97 |
| 5,765,597 A * | 6/1998 | Kiest, Jr. | B29C 63/36 | 138/97 |
| 5,794,663 A * | 8/1998 | Kiest, Jr. | B29C 63/36 | 138/97 |
| 5,816,293 A * | 10/1998 | Kiest, Jr. | B29C 63/0095 | 138/98 |
| 5,824,246 A * | 10/1998 | Reetz | B27N 3/086 | 264/122 |
| 5,868,169 A * | 2/1999 | Catallo | F16L 58/02 | 138/124 |
| 5,899,636 A * | 5/1999 | Toyoda | B29C 63/36 | 405/157 |
| 5,950,682 A * | 9/1999 | Kiest, Jr. | B29C 63/36 | 138/97 |
| 5,964,249 A * | 10/1999 | Kiest, Jr. | B29C 63/0095 | 138/97 |
| 5,971,029 A * | 10/1999 | Smith | F16L 11/20 | 138/113 |
| 6,024,910 A * | 2/2000 | Kamiyama | B29C 63/34 | 138/97 |
| 6,058,978 A * | 5/2000 | Palette | B29C 63/343 | 138/97 |
| 6,105,619 A * | 8/2000 | Kiest, Jr. | B29C 63/36 | 138/97 |
| RE36,859 E * | 9/2000 | Storah | B29C 49/26 | 138/97 |
| 6,117,507 A * | 9/2000 | Smith | B29C 47/0004 | 138/97 |
| 6,244,846 B1 * | 6/2001 | Keller | B29C 63/36 | 118/254 |
| 6,382,876 B2 * | 5/2002 | Lee | F16L 55/164 | 138/97 |
| 6,539,979 B1 * | 4/2003 | Driver | F16L 55/1651 | 138/97 |
| 6,679,293 B2 | 1/2004 | Driver | | |
| 6,708,728 B2 * | 3/2004 | Driver | F16L 55/1654 | 138/97 |
| 6,868,870 B2 * | 3/2005 | Warren | F16L 55/1654 | 138/97 |
| 6,942,426 B1 * | 9/2005 | Kampbell | F16L 55/1654 | 138/97 |
| 6,969,216 B2 * | 11/2005 | Driver | F16L 55/1651 | 138/97 |
| 7,096,890 B2 * | 8/2006 | Woolstencroft | F16L 55/1656 | 138/125 |
| 7,121,766 B2 * | 10/2006 | De Bruijn | B29C 63/0086 | 405/184.2 |
| 7,131,791 B2 * | 11/2006 | Whittaker | E03F 3/06 | 405/184.2 |
| 7,270,150 B2 * | 9/2007 | Warren | F16L 55/165 | 138/97 |
| 7,343,937 B2 * | 3/2008 | Kiest, Jr. | F16L 55/1651 | 138/97 |
| 7,476,348 B2 * | 1/2009 | Waring | B29C 63/36 | 138/97 |
| 7,478,650 B2 * | 1/2009 | Pleydon | B32B 7/12 | 138/98 |
| 7,527,076 B2 * | 5/2009 | Lepola | B29C 63/36 | 138/97 |
| 7,766,048 B2 * | 8/2010 | Driver | F16L 55/1651 | 138/97 |

(56) References Cited

U.S. PATENT DOCUMENTS

| | | | | |
|---|---|---|---|---|
| 7,789,643 B2* | 9/2010 | Lepola | ................ | G21C 17/017 |
| | | | | 138/97 |
| 7,803,245 B2* | 9/2010 | Kamiyama | ......... | F16L 55/1651 |
| | | | | 138/98 |
| 7,845,372 B2* | 12/2010 | Kiest, Jr. | ............. | F16L 55/1651 |
| | | | | 138/97 |
| 8,038,913 B2* | 10/2011 | Driver | .................... | B29C 63/36 |
| | | | | 264/36.17 |
| 8,591,695 B2* | 11/2013 | Warren | ............... | F16L 55/1651 |
| | | | | 138/98 |
| 8,807,171 B1* | 8/2014 | Tanner | ................ | F16L 55/1654 |
| | | | | 138/97 |
| 8,940,113 B2* | 1/2015 | Lindner | .................. | B32B 37/02 |
| | | | | 156/64 |
| 9,028,642 B2* | 5/2015 | Taylor | .................... | B29C 63/36 |
| | | | | 156/293 |
| 9,453,597 B2* | 9/2016 | Delaney | ................. | B29C 63/36 |
| 9,851,041 B2* | 12/2017 | Waring | ............... | F16L 55/1651 |
| 9,851,042 B2* | 12/2017 | Daveloose | .......... | F16L 55/1656 |
| 2004/0200393 A1* | 10/2004 | Zauderer | .................. | C01B 3/02 |
| | | | | 110/345 |

* cited by examiner

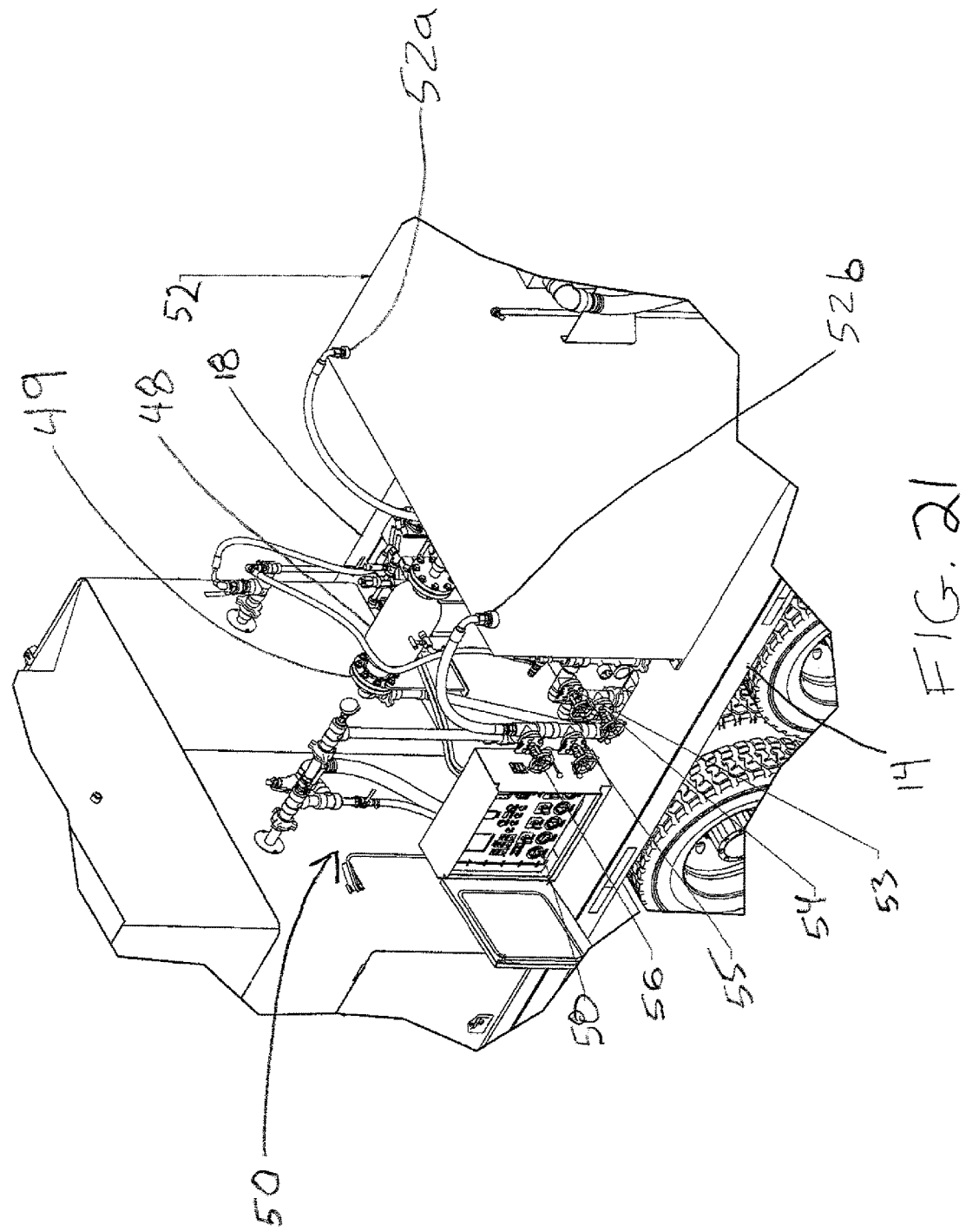

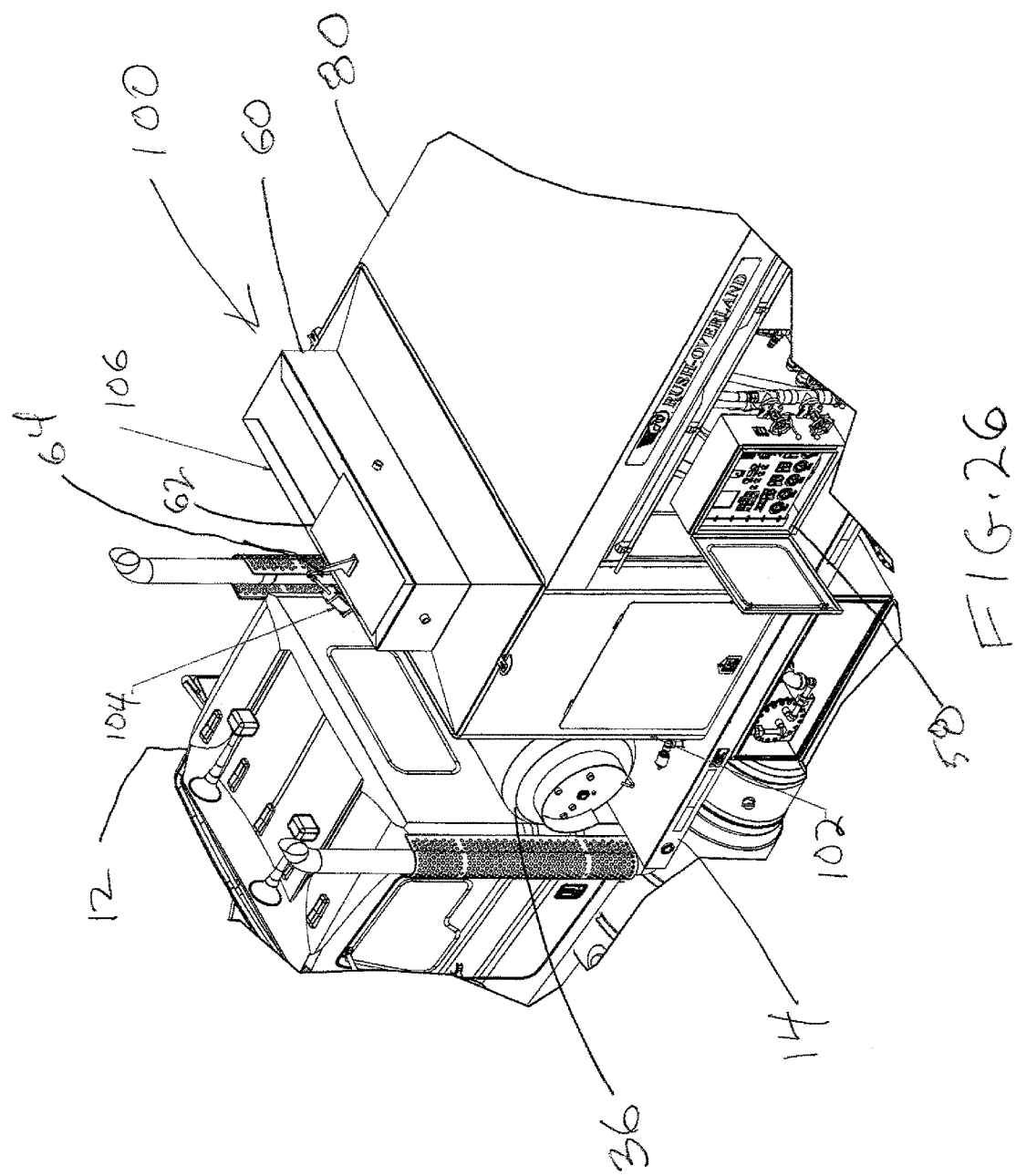

CURED-IN-PLACE PIPE UNIT AND REHABILITATION

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

BACKGROUND

Technical Field

The subject matter generally relates to an apparatus and methods in the field of cured-in-place-pipe installation for reconstruction of pipeline(s) and conduit(s).

Needs exist for the repair and/or rehabilitation of pipeline(s) and conduit(s). One such technique for accomplishing same is referred to as "Cured-in-place" pipe or "CIPP". "Cured-in-place" pipe has the advantage of being a trenchless technique for repair and/or rehabilitation of pipeline(s) and/or conduit(s) that is either leaking or structurally unsound. Normally Cured-in-place pipe (initially as a liner installed as it is wet out on site) is installed into the existing pipe/conduit in one of two ways. The first is by pulling a resin-impregnated flexible tube into place ("Pulled-in-Place") for curing-in-place of, typically, a thermosetting resin pipe. The second is by inverting or inversion of the typically resin-impregnated flexible tube/pipe/conduit under pressure for curing-in-place of the typically resin-impregnated tube). Sometimes the liner can be installed through a manhole or other pre-existing access point. After installation the liner must be cured for a sufficient period of time. This application hereby incorporates by reference the disclosure, teachings and/or drawings of U.S. Pat. No. 7,131,791, German Patent No. DE212006000006, U.S. Pat. No. 6,708,728 and U.S. Pat. No. 6,679,293 as examples of "CIPP" apparatus, techniques and methods.

The pulled-in-place method generally includes impregnating a coated lining tube with resin and pulling this lining tube (liner) into the existing pipe. Next, the liner is expanded, generally by inflating a bladder with water or air. Then, the resin is cured by applying heat (such as, for example, by steam, hot water, or lamps pulled through the liner). Pulled-in-place liners typically have exterior and interior coatings to hold the resin in the flexible tube during the impregnation process and to prevent the loss of resin during the pulling/insertion step(s).

The inversion method generally includes inverting a resin-impregnated liner tube through the existing pipe. The liner tube is essentially pushed inside-out using water or air pressure. The outside of inverted liners are coated to hold the resin, but during installation the coating is inverted with the liner and serves as a coating on the inside of the liner with the wet resin now on the exterior of the liner. The process and system may vary depending on whether water or air pressure is used to invert the liner. The curing step may be performed by circulating hot water through recirculation hoses in the liner tube or by introducing or circulating controlled steam.

BRIEF SUMMARY

Apparatus and methodology for installing and curing of "Cured-in-place" pipe, mounted unitarily as a mobile unit having a pressurization system such as a low pressure-high volume blower system, a low-NOx burner system, a power system such as a hydraulic reservoir, electrical and/or motor driven, and a burner chamber system.

BRIEF DESCRIPTION OF THE FIGURES

The exemplary embodiments may be better understood, and numerous objects, features, and advantages made apparent to those skilled in the art by referencing the accompanying drawings. These drawings are used to illustrate only exemplary embodiments, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

FIG. 21 depicts a breakaway perspective view of an exemplary embodiment of the steam separator system.

FIG. 26 depicts a breakaway perspective view of an exemplary embodiment of the burner chamber system.

DETAILED DESCRIPTION OF THE EXEMPLARY EMBODIMENT(S)

Figure 1:
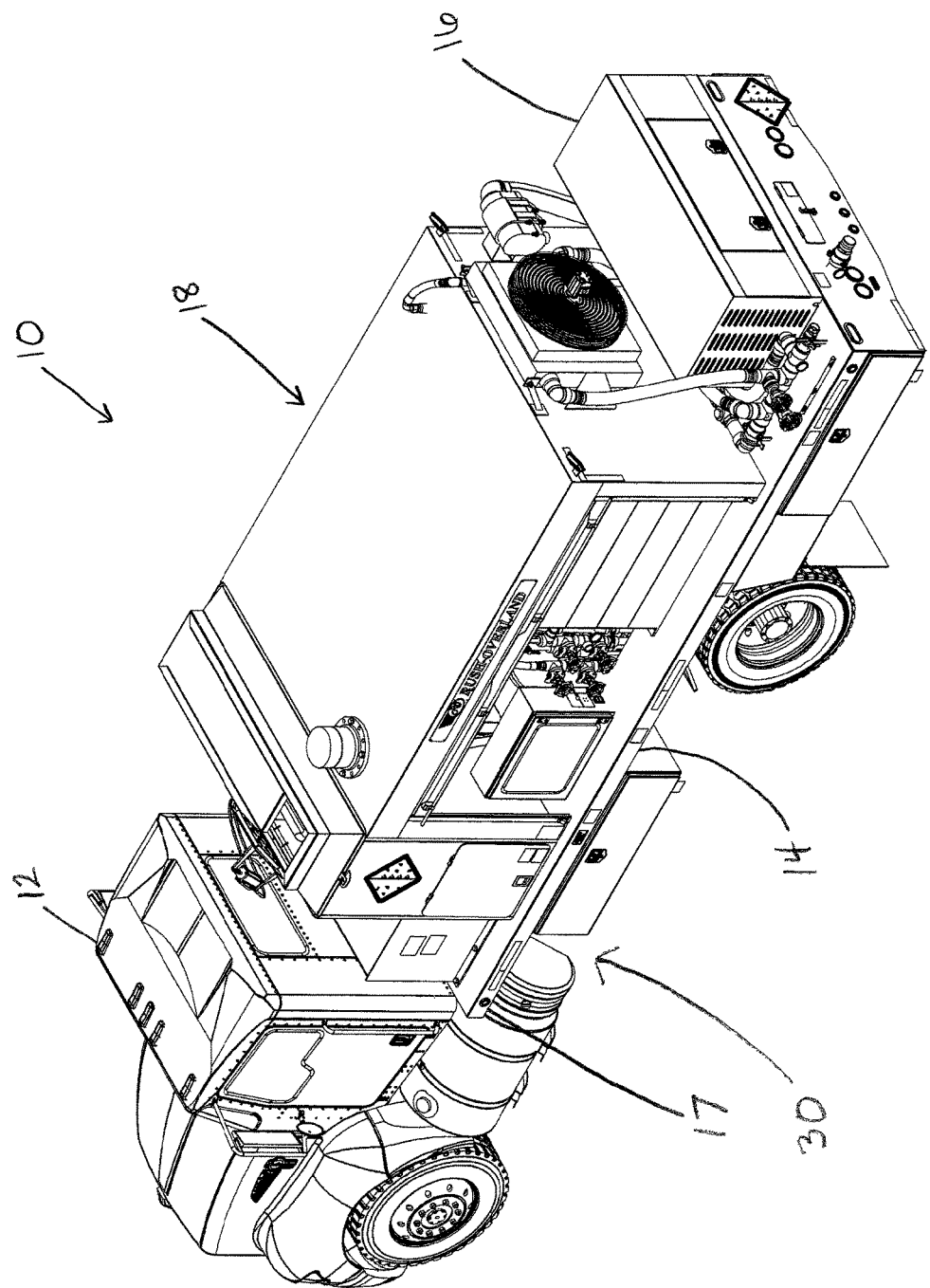
FIG. 1 depicts a perspective view of an exemplary embodiment of a unit used for installation and curing of "Cured-in-place" pipe.
Figure 2:
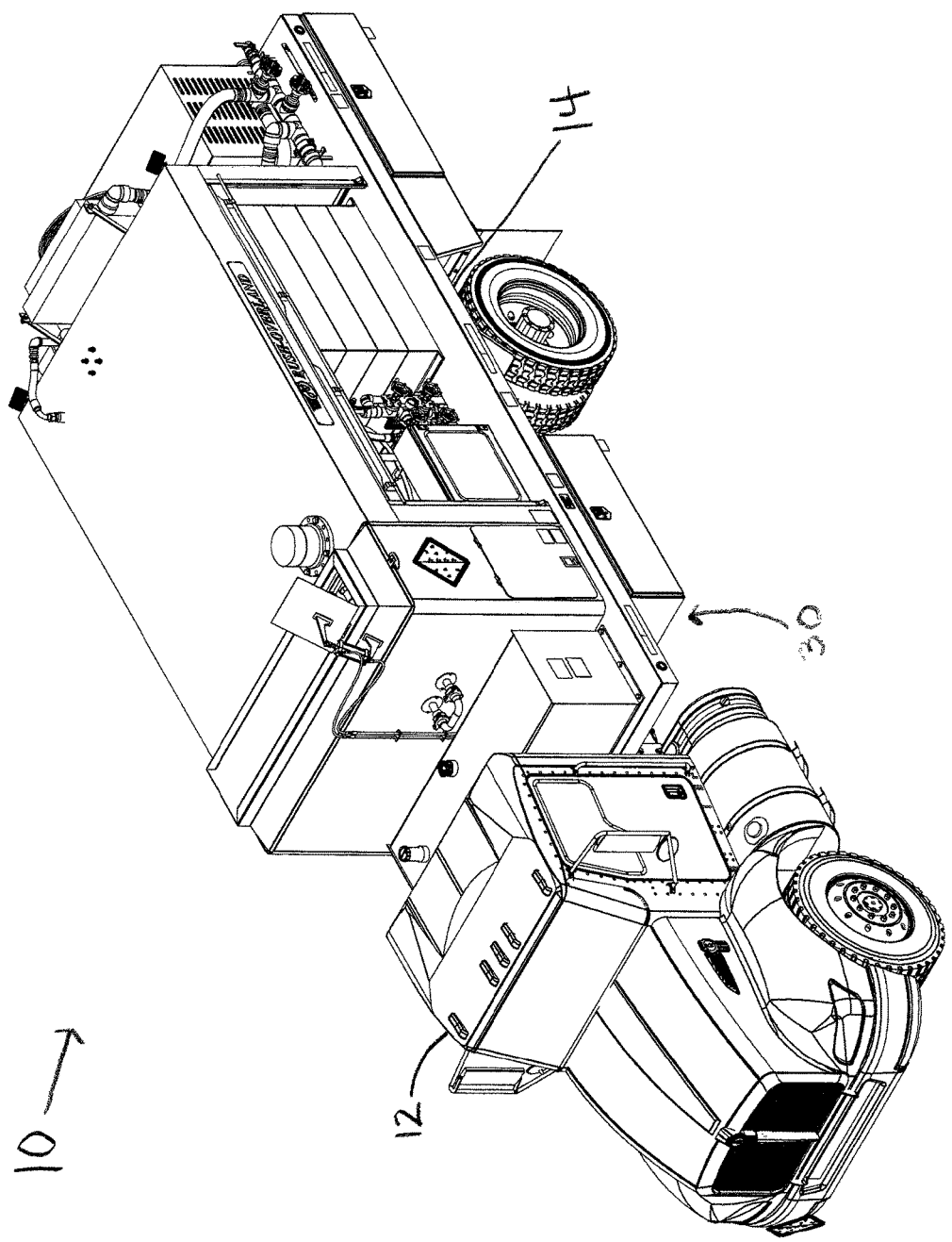
FIG. 2 depicts another perspective view of an exemplary embodiment of the unit.
Figure 3:
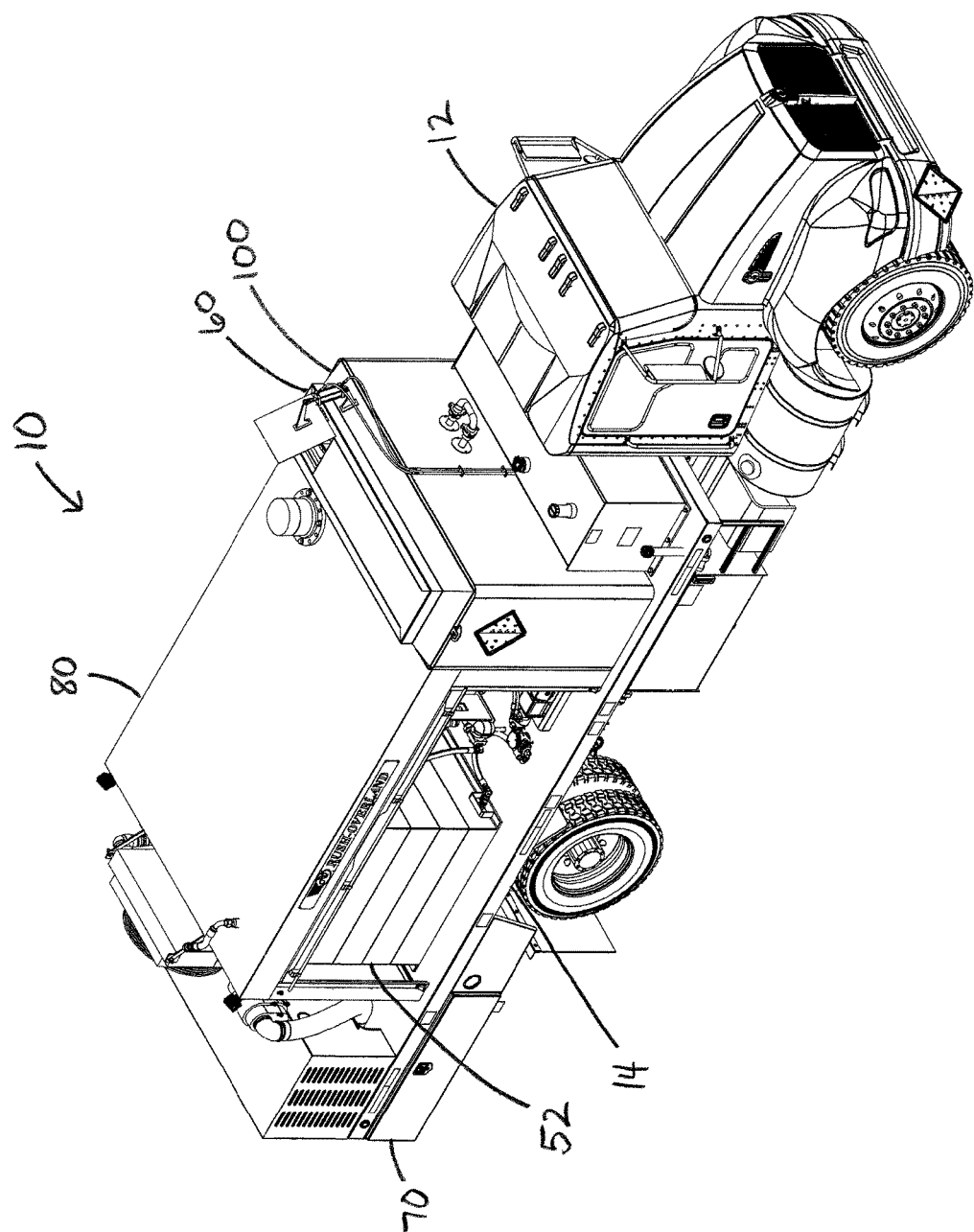
FIG. 3 depicts another perspective view of an exemplary embodiment of the unit.
Figure 4:
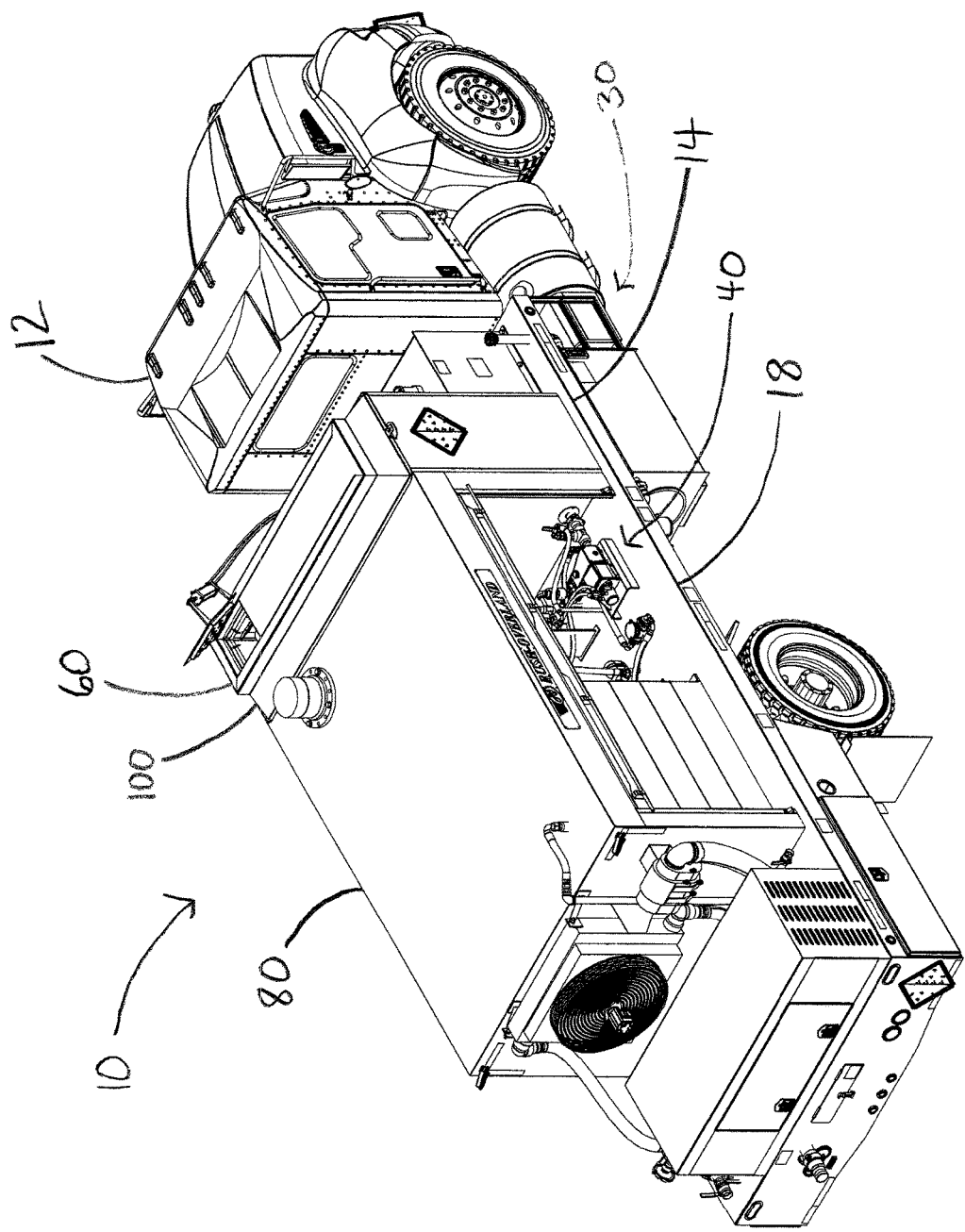
FIG. 4 depicts another perspective view of an exemplary embodiment of the unit.

The description that follows includes exemplary apparatus, methods, techniques, and instruction sequences that embody techniques of the inventive subject matter. However, it is understood that the described exemplary embodiments may be practiced without these specific details.

Referring to FIGS. 1-4, a unit 10 is shown which may, for example, be mounted on a vehicle or mobile 12 having a bed 14. The unit 10 is generally a propane burning steamer with low nitrous-oxide exhaust used for the reconstruction of pipelines and conduits by the pulled-in-place or inversion installation of a resin-impregnated, flexible fabric tube into an existing conduit and secondarily inflated through the inversion of a calibration hose by the use of a hydrostatic head or air pressure. The resin may be cured by circulating hot water or by the introduction of controlled steam into the tube. When cured, the finished cured-in-place pipe will be continuous and tight fitting. This reconstruction process may be used in a variety of gravity and pressure applications such as sanitary sewers, storm sewers, process piping, electrical conduits, and ventilation systems. The unit 10 may have a rear portion or sub frame 16 of the bed 14, a front portion or sub frame 17 of the bed 14, and a mid-portion or sub frame 18 of the bed 14.

Figure 5:
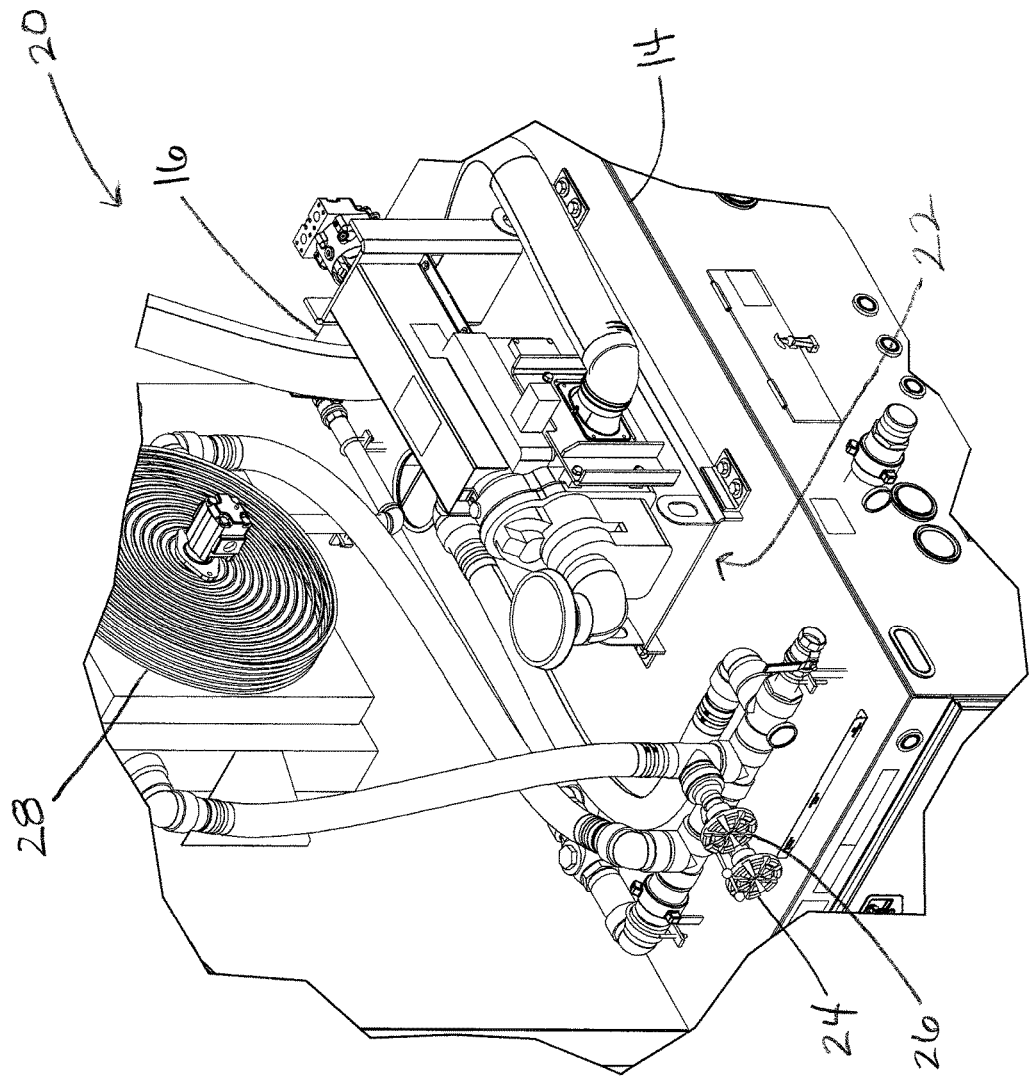
FIG. 5 depicts a breakaway perspective view of an exemplary embodiment of the low pressure-high volume blower system.

In an exemplary embodiment referring to FIG. 5, a pressurization system in the form of a low pressure-high volume blower system 20 may be mounted at the rear portion 16 of the bed 14. The low pressure-high volume blower system 20 generally has a low pressure-high volume blower 22, a bypass control valve 24, a cool-off control valve 26, and an air cooler 28. The low pressure-high volume blower 22 may, for example, be a 750 cubic-foot-per-minute (CFM) hydraulically, electrically and/or motor driven low pressure-high volume blower 22 to supply air or the like for the process of installing the CIPP liner. The bypass control valve 24 allows a controller to bypass the air cooler 28 thereby allowing hot air to air steam mixture. The cool-off control valve 26 allows a controller to cool off air from low pressure-high volume blower 22 for use in the CIPP liner cooldown process. The air cooler 28 is used to cool down air incoming from the low pressure-high volume blower 22.

Figure 6:
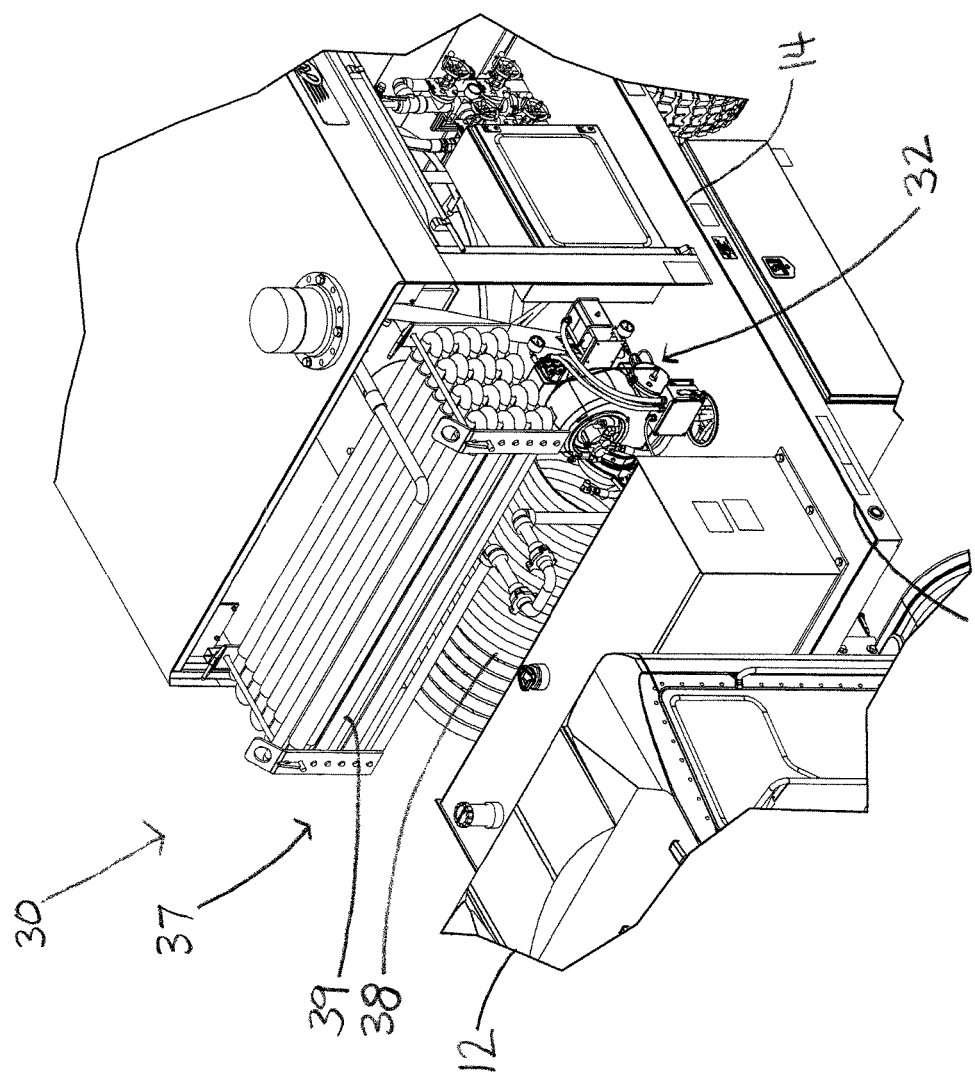
FIG. 6 depicts a breakaway perspective view of an exemplary embodiment of the burner system.

In an exemplary embodiment referring to FIG. 6, a burner system 30 may be mounted at the front portion 17 of the bed 14. The burner system 30 generally has a burner 32, a vaporizer 34 (not directly shown in FIG. 6 or see FIG. 19), a supply tank 36 (not directly shown or see FIG. 19), and a heat exchanger system 37 generally including a first heat exchanger 38, plus a second heat exchanger 39. The burner 32 may, for example, be a 4.2 MBTU low NOx (nitrogen oxide) burner 32 for providing heat to the heat exchanger system 37. The vaporizer may, for example, be a liquid propane vaporizer to provide gaseous propane to the burner 32. The supply tank 36 may, for example, be a liquid propane supply tank 36 for supplying propane to the burner 32. The heat exchanger system 37 generally includes the first heat exchanger 38 as a helical heat exchanger, plus the second heat exchanger 39 as an economizer. The heat exchanger system 37 is used in the creation of steam.

Figure 7:
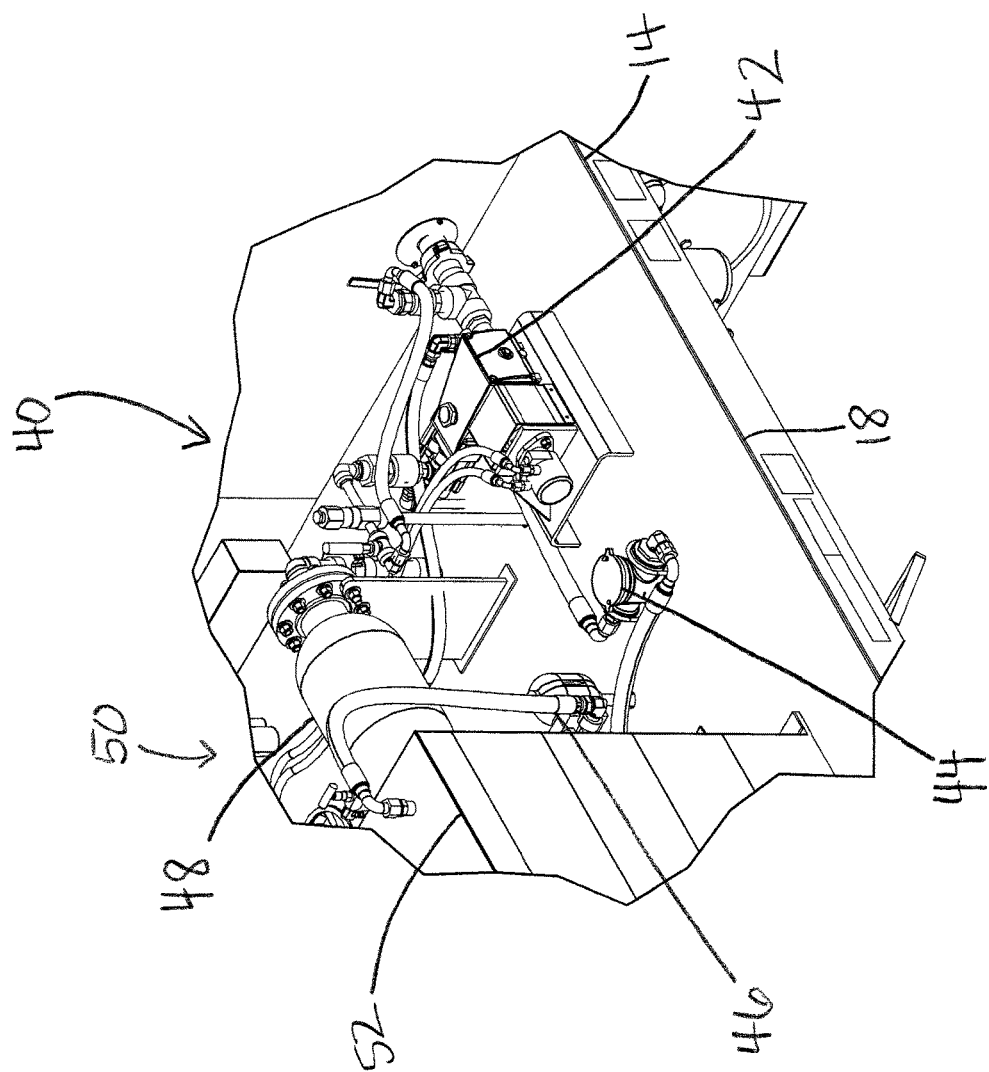
FIG. 7 depicts a breakaway perspective view of an exemplary embodiment of the pumping system.

In an exemplary embodiment referring to FIG. 7, a pumping system 40 may be mounted proximate a mid-portion or sub frame 18 of the bed 14. The pumping system 40 generally includes a water pump 42, a strainer 44, a steam trap 46 and a steam separator 48. The water pump 42 is preferably a high pressure water pump to, in one exemplary embodiment, supply water to the coil or heat exchangers 38 & 39 at six gallons-per-minute at 850 rotations-per-minute (such as, for example, a high pressure water pump sold under the brand CAT PUMPS). The strainer 44 is in line with the pump 42 and in one example is a basket strainer used to remove debris for water. The steam trap 46 is in line with the steam separator 48 and is used to collect condensate from the steam separator 48 and return to the water supply tank 52. The steam separator 48 aids in removing water particles from the steam in order to provide relatively dryer steam to and during the CIPP liner curing process.

Figure 8:
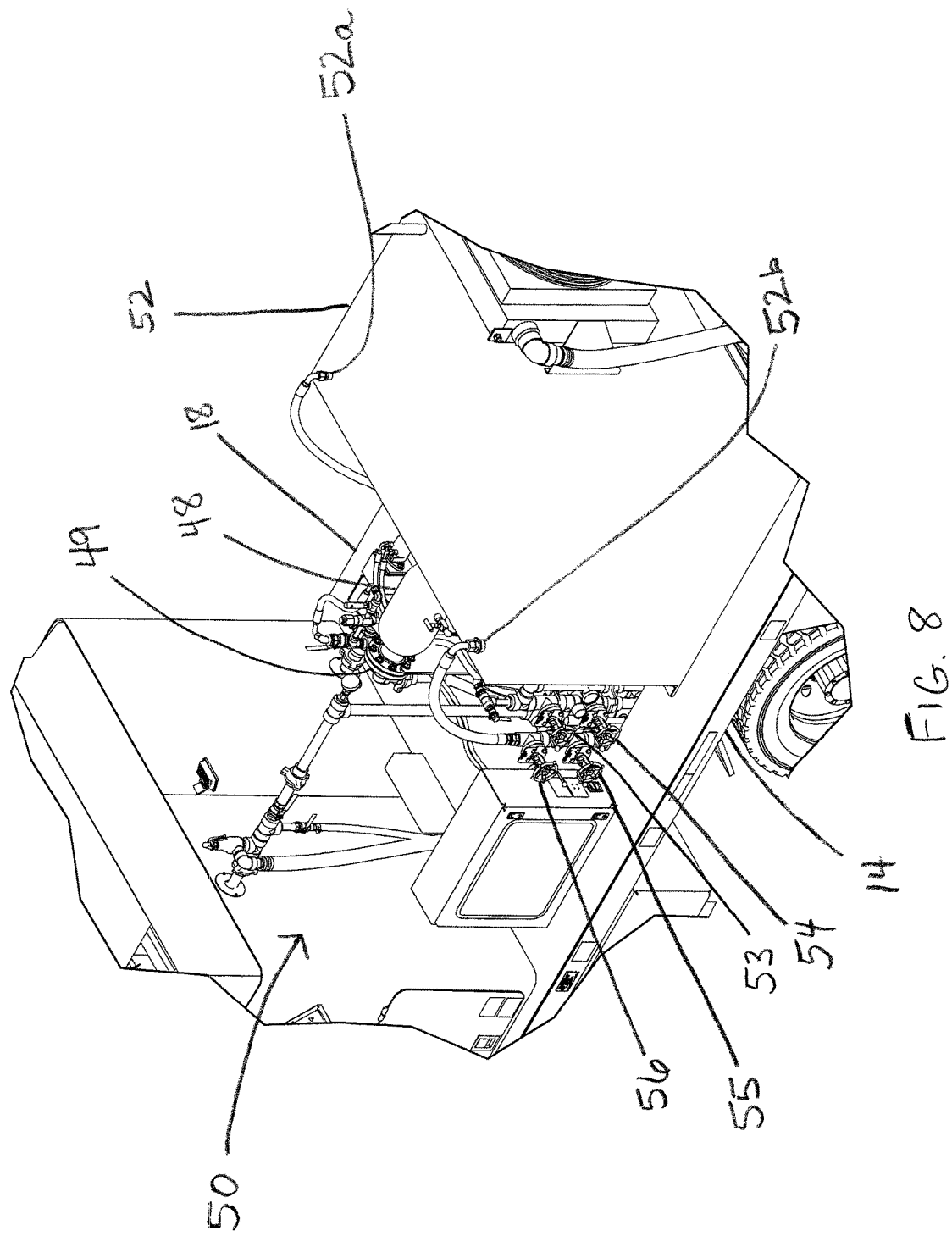
FIG. 8 depicts a breakaway perspective view of an exemplary embodiment of the steam separator system.

In an exemplary embodiment referring to FIG. 8, a steam separator system 50 may be mounted proximate the mid-portion or sub frame 18 of the bed 14. The steam separator system 50 generally includes the steam separator 48, a water supply tank 52, a steam throttle valve 53, a steam bypass valve 54, a steam discharge valve 55, a tank return valve 56, and a control station 58 (not directly shown in FIG. 8 or see FIG. 21). The water supply tank 52 is in line with the steam trap 46 at an outlet 52a and in line with the tank return valve 56 at the inlet 52b. The water supply tank 52 may, for example, supply fresh water with a capacity of 750 gallons. The steam throttle valve 53 allows steam to enter in order to create an air steam mixture. The steam bypass valve 54 is in line with and aids the steam throttle valve 53 to bypass excess steam to atmosphere. The steam discharge valve 55 is in line with the steam bypass valve 54 and the steam separator 48, and allows steam to enter into a steam separator 48 manifold 49. The tank return valve 56 is in line with the steam discharge valve 55 and is used in a pre-steam process to cycle water until sufficient temperatures are reached for the creation of steam. The control station 58 is generally a control station 58 for operation of the unit 10 for CIPP processes.

Figure 9:
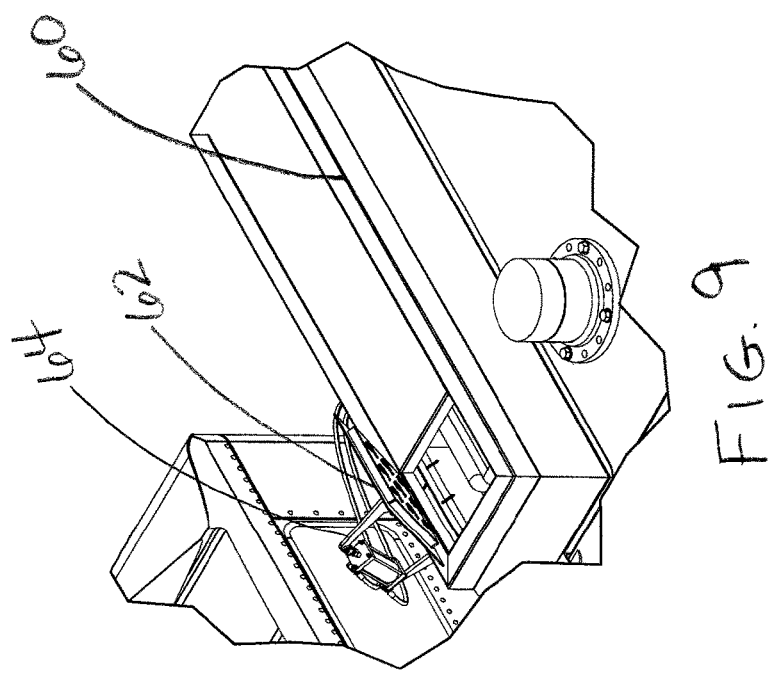
FIG. 9 depicts a breakaway perspective view of an exemplary embodiment of the firebox.

In an exemplary embodiment referring to FIG. 9, a firebox 60 may be mounted proximate and above the burner 32 and/or burner system 30. The firebox 60 may include an exhaust lid 62. The exhaust lid 62 is for use when the CIPP unit 10 is not in operation to keep debris out of the firebox 60. The exhaust lid 62 may include a hinged arm 64 for selective opening and closing of the exhaust lid 62.

Figure 10:
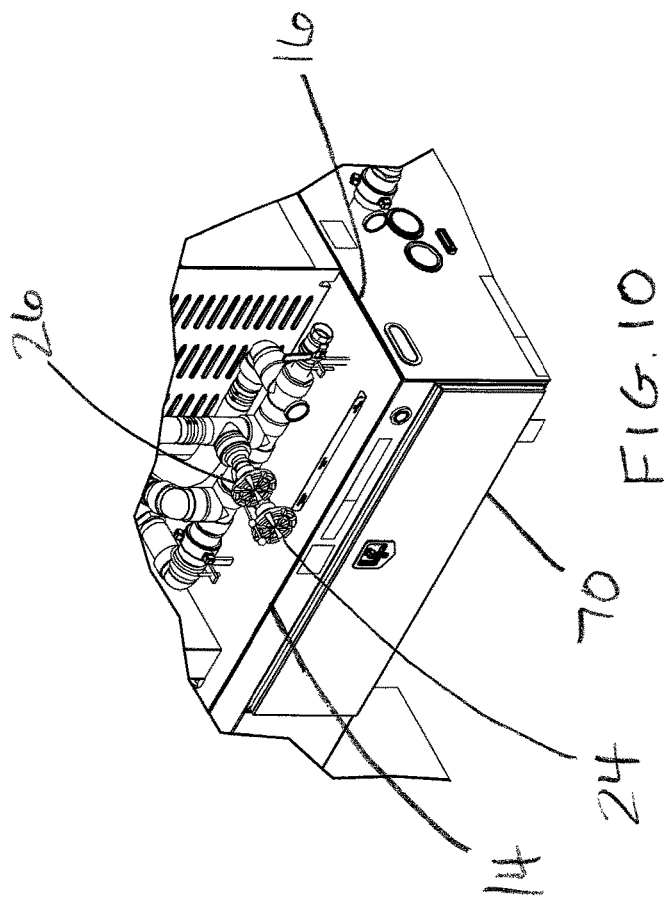
FIG. 10 depicts a breakaway perspective view of an exemplary embodiment of a toolbox.

In an exemplary embodiment referring to FIG. 10, toolbox(es) 70 may be mounted in one or more locations around or proximate the bed 14. The toolbox(es) 70 is/are mounted around the unit 10 to provide storage space for various tools needed for helpful for operation of the unit 10.

Figure 11:
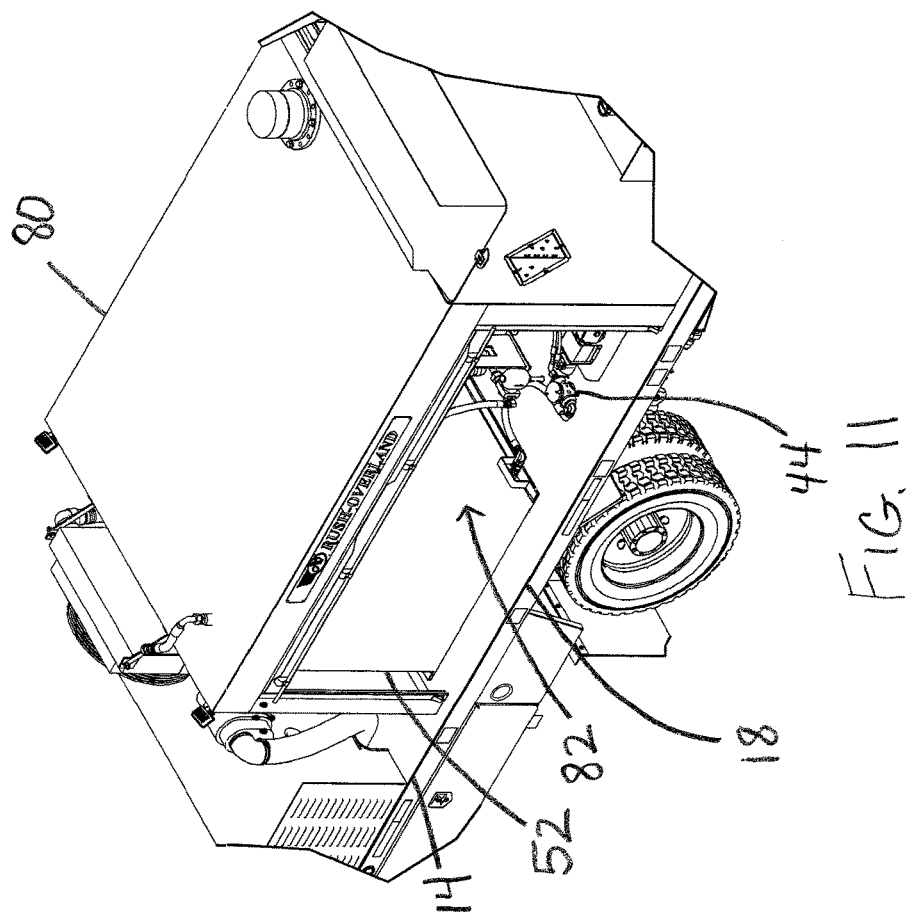
FIG. 11 depicts a breakaway perspective view of an exemplary embodiment of the manifold enclosure.

In an exemplary embodiment referring to FIG. 11, a manifold enclosure 80 may be mounted above and proximate the manifold 82 (or the pumping system 40 and the steam separator system 50) and generally above the mid-portion 18 of the bed 14. The manifold enclosure 80 keeps debris off of the manifold 82.

Figure 12:
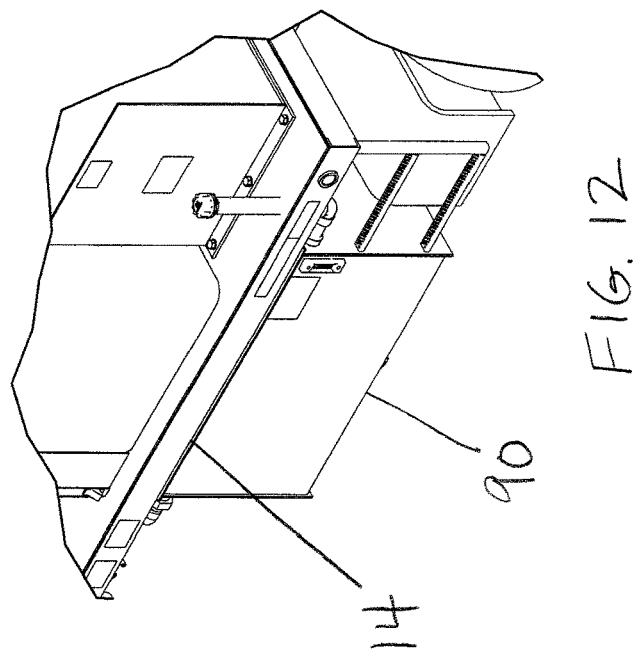
FIG. 12 depicts a breakaway perspective view of an exemplary embodiment of the hydraulic reservoir.

In an exemplary embodiment referring to FIG. 12, a power system as a hydraulic reservoir or tank 90 may be mounted to the bed 14 and beneath it. The hydraulic reservoir 90 is used for containing and maintaining optimal hydraulic fluid operating temperatures for operation of hydraulically powered features of the unit 10.

Figure 13:
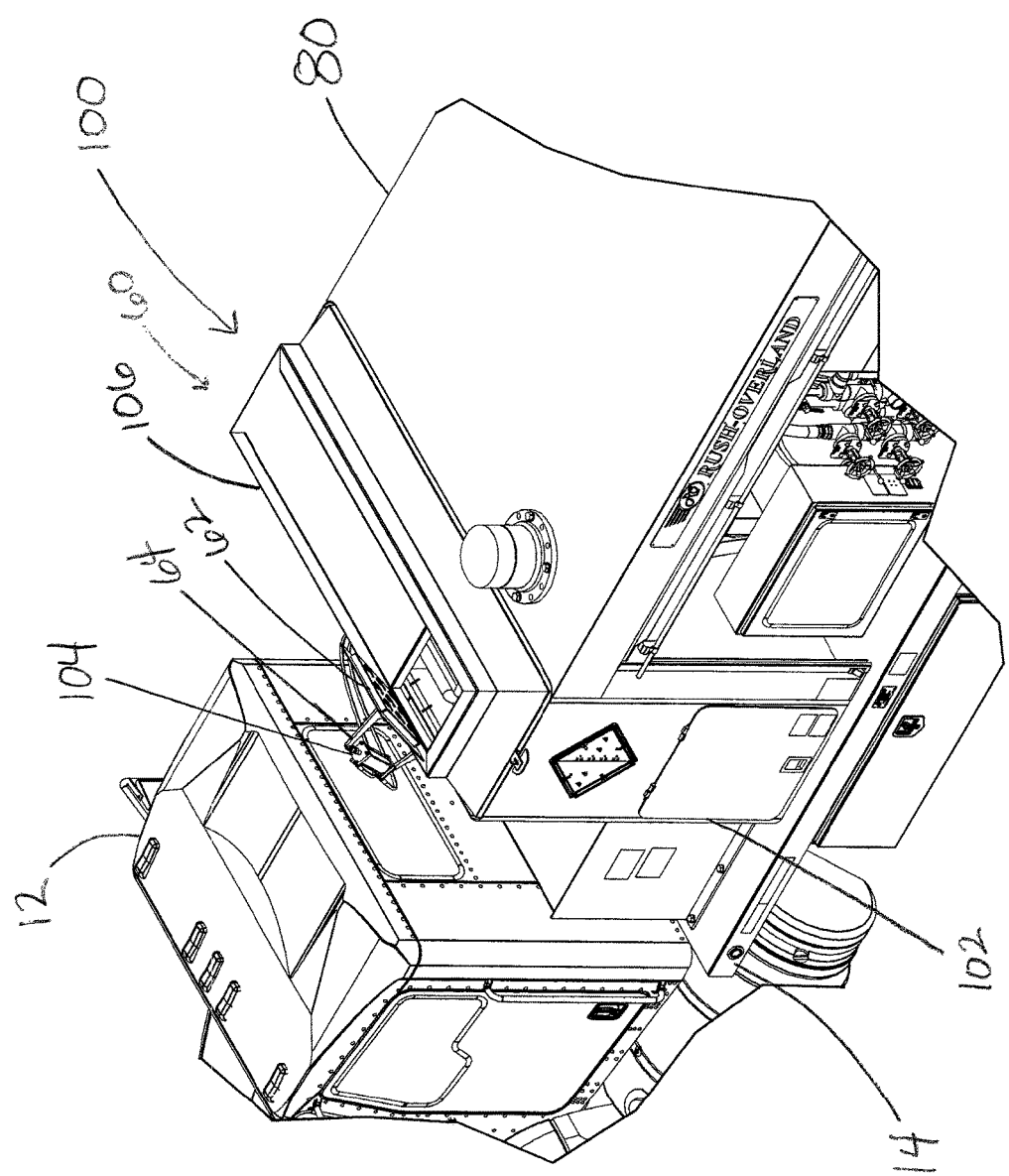
FIG. 13 depicts a breakaway perspective view of an exemplary embodiment of the burner chamber system.
Figure 14:
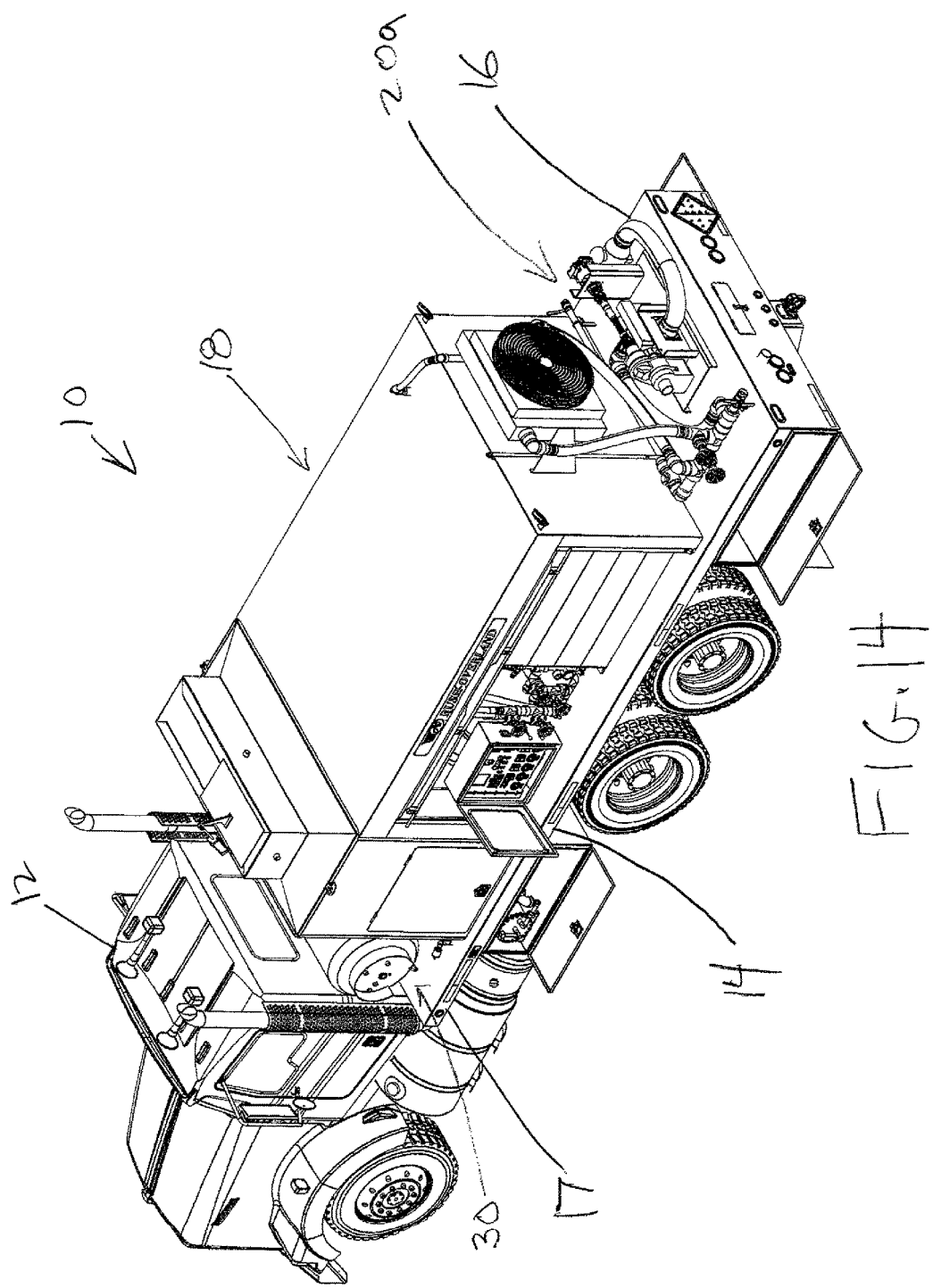
FIG. 14 depicts a perspective view of a second exemplary embodiment of a unit used for installation and curing of "Cured-in-place" pipe.
Figure 15:
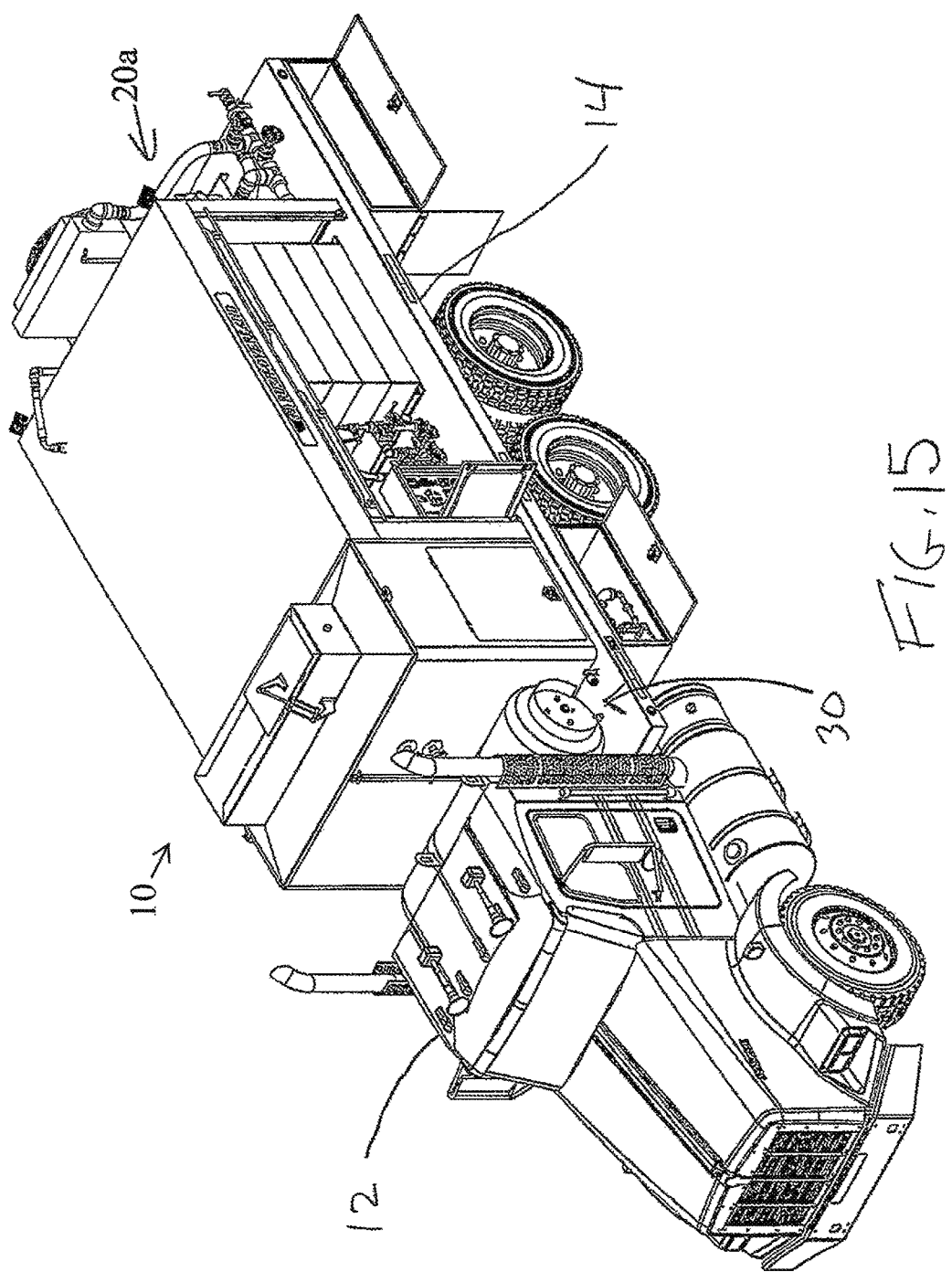
FIG. 15 depicts another perspective view of the second exemplary embodiment of the unit.
Figure 16:
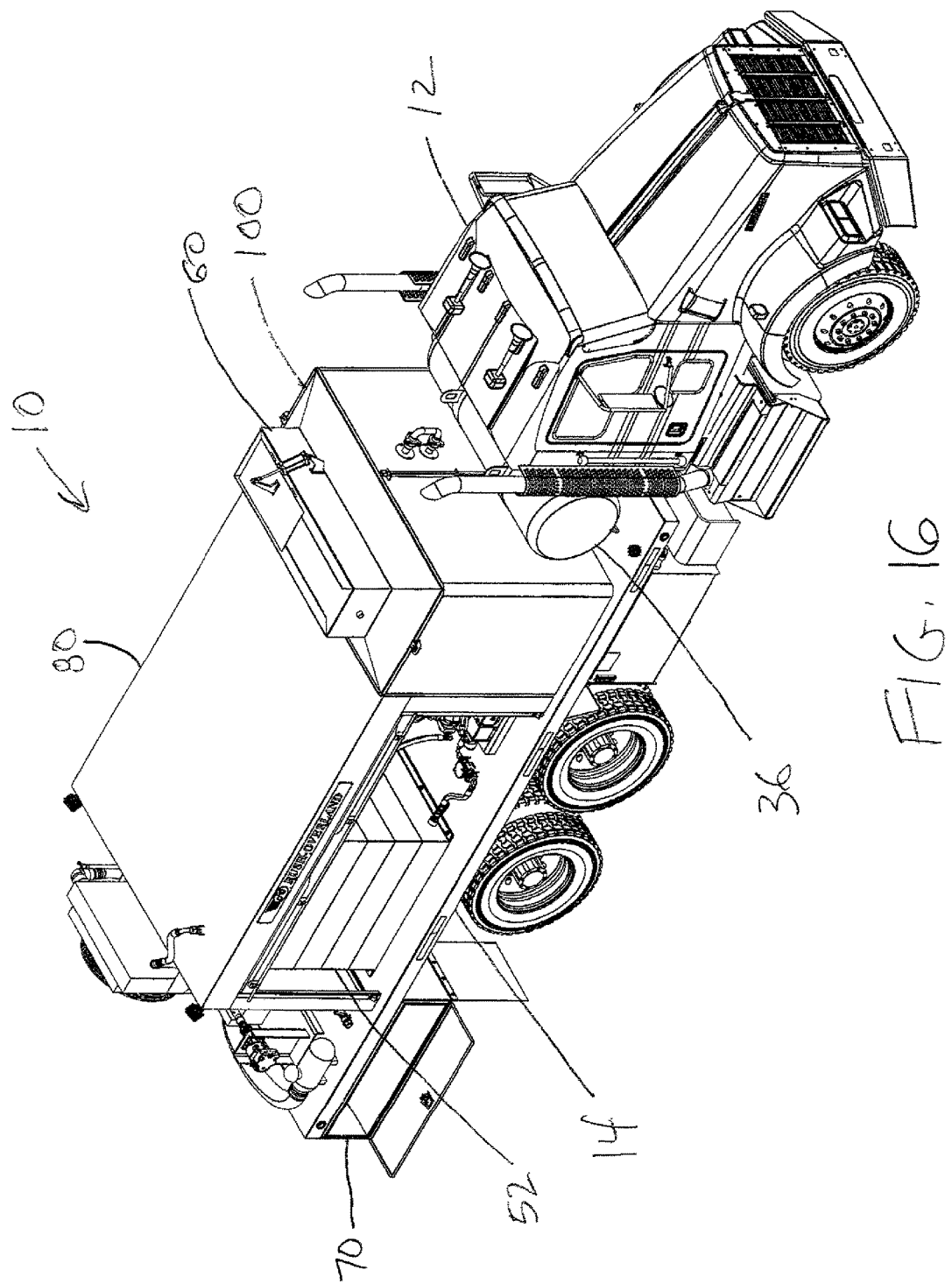
FIG. 16 depicts another perspective view of the second exemplary embodiment of the unit.
Figure 17:
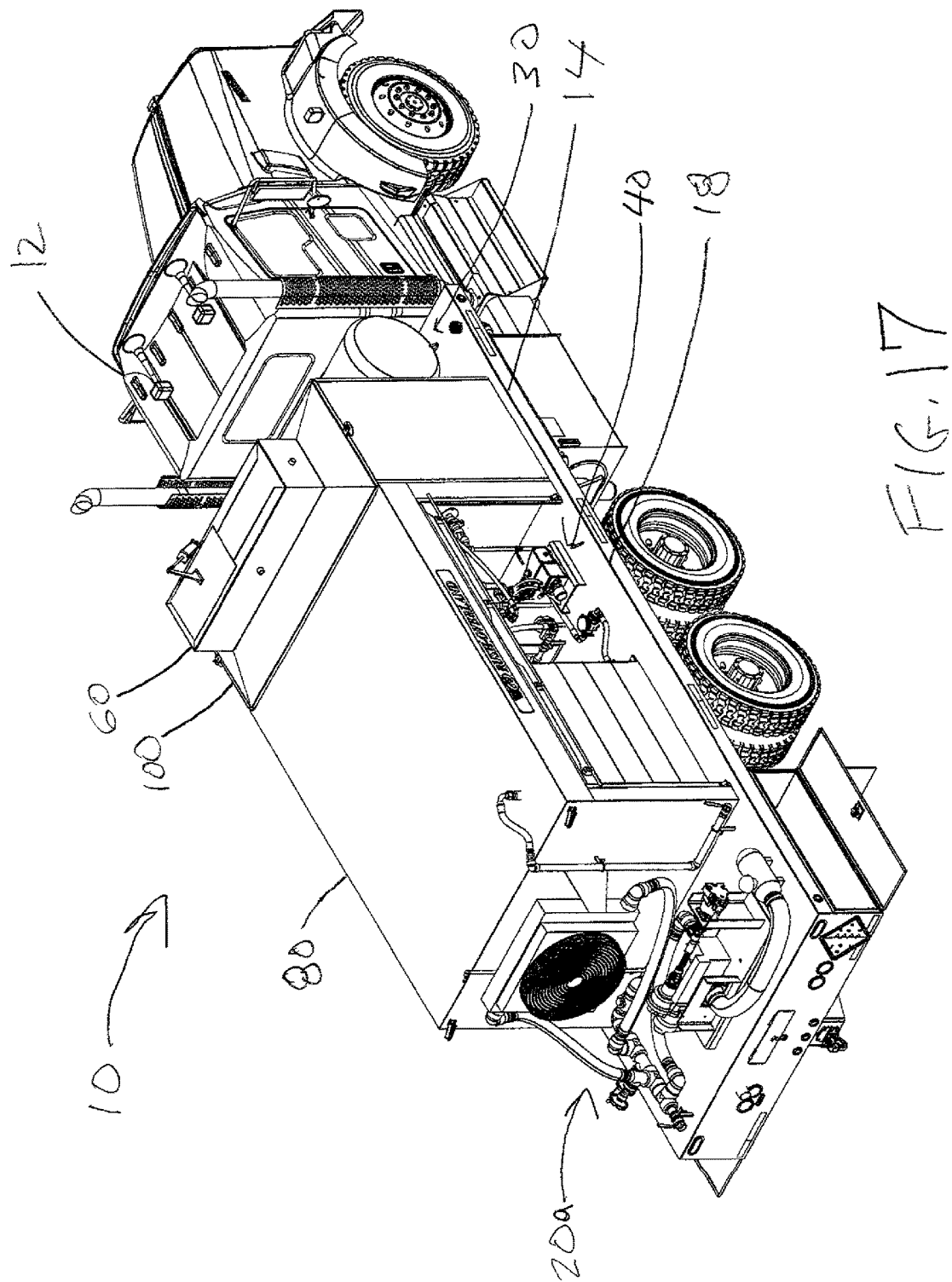
FIG. 17 depicts another perspective view of the second exemplary embodiment of the unit.

In an exemplary embodiment referring to FIG. 13 which relates to FIG. 9, a burner chamber system 100 is mounted proximate and around the burner 32 and/or burner system 30 above the bed 14. The burner chamber system 100 includes a burner chamber 102, an air cylinder 104 and a burner chamber top 106. The burner chamber 102 is used to container burner flame around the burner system 30 including the burner 32 and the heat exchanger system 37. The air cylinder 104 is used to open the burner chamber lid or exhaust lid 62 from the firebox 60 during operations. The air cylinder 104 is part the hinged arm 64 for selective opening and closing of the exhaust lid 62. The burner chamber top 106 is part of the firebox 60 and is used to relieve the system of exhaust gasses and maintain slight backpressure on the burner 32 for optimal firing conditions.

Referring to FIGS. 14-17 a unit 10 is shown which may, for example, be mounted on a vehicle or mobile 12 having a bed 14. The unit 10 is generally a propane burning steamer with low nitrous-oxide exhaust used for the reconstruction of pipelines and conduits by the pulled-in-place or inversion installation of a resin-impregnated, flexible fabric tube into an existing conduit and secondarily inflated through the inversion of a calibration hose by the use of a hydrostatic head or air pressure. The resin may be cured by circulating hot water or by the introduction of controlled steam into the tube. When cured, the finished cured-in-place pipe will be continuous and tight fitting. This reconstruction process may be used in a variety of gravity and pressure applications such as sanitary sewers, storm sewers, process piping, electrical conduits, and ventilation systems. The unit 10 may have a rear portion or sub frame 16 of the bed 14, a front portion or sub frame 17 of the bed 14, and a mid-portion or sub frame 18 of the bed 14.

Figure 18:
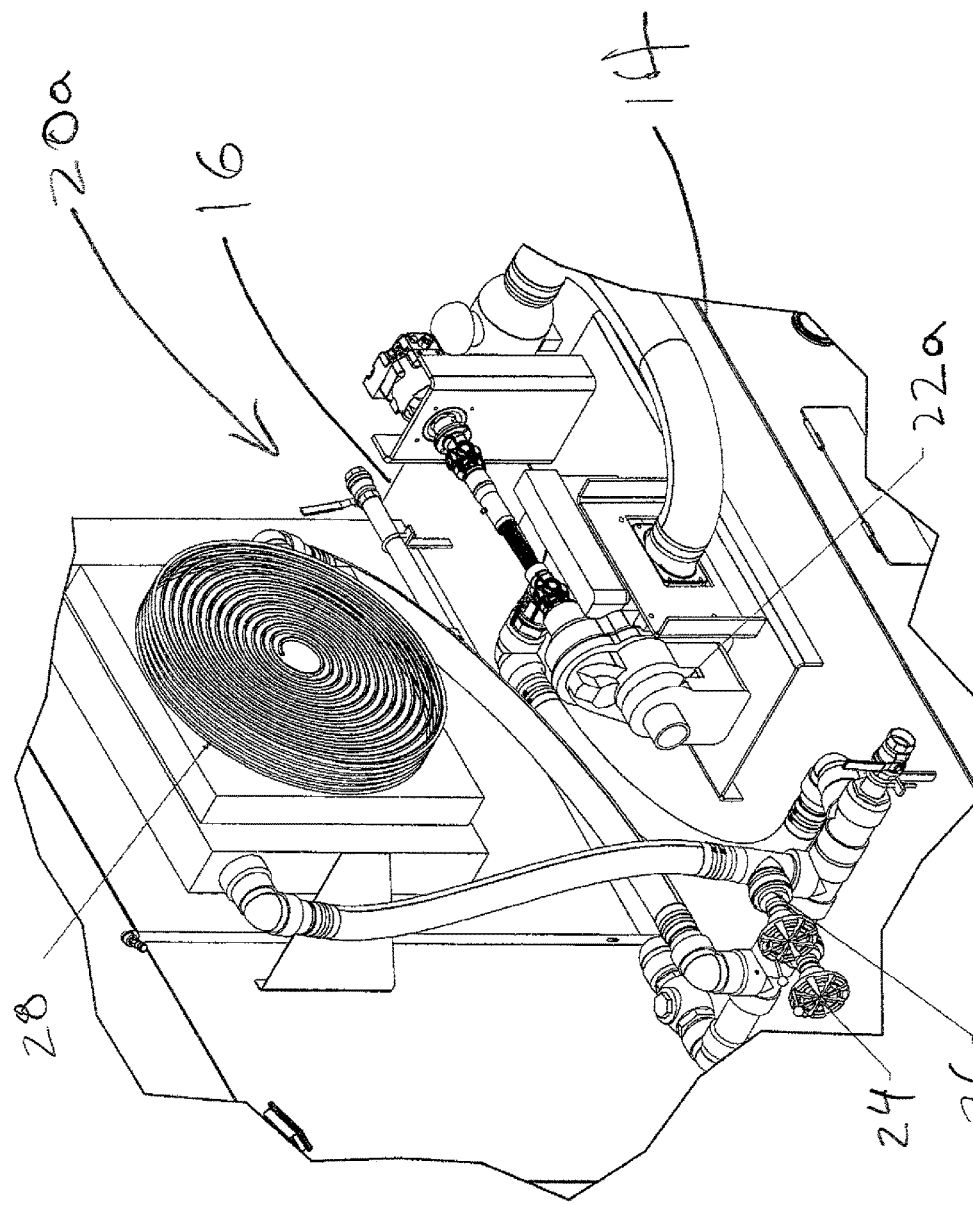
FIG. 18 depicts a breakaway perspective view of an exemplary embodiment of the compressor system.

In an exemplary embodiment referring to FIG. 18, a pressurization system in the form of a compressor system 20a (e.g. a high pressure air compressor 20a) may be mounted at the rear portion 16 of the bed 14. The compressor system 20a generally has a compressor 22a, a bypass control valve 24, a cool-off control valve 26, and an air cooler 28. The compressor 22a may, for example, be a 650 cubic-foot-per-minute (CFM) hydraulically, electrically and/or motor driven compressor 22a to supply air or the like for the process of installing the CIPP liner. The bypass control valve 24 allows a controller to bypass the air cooler 28 thereby allowing hot air to air steam mixture. The cool-off control valve 26 allows a controller to cool off compressed air from compressor 22a for use in the CIPP liner cooldown process. The air cooler 28 is used to cool down air incoming from the compressor 22a.

Figure 19:
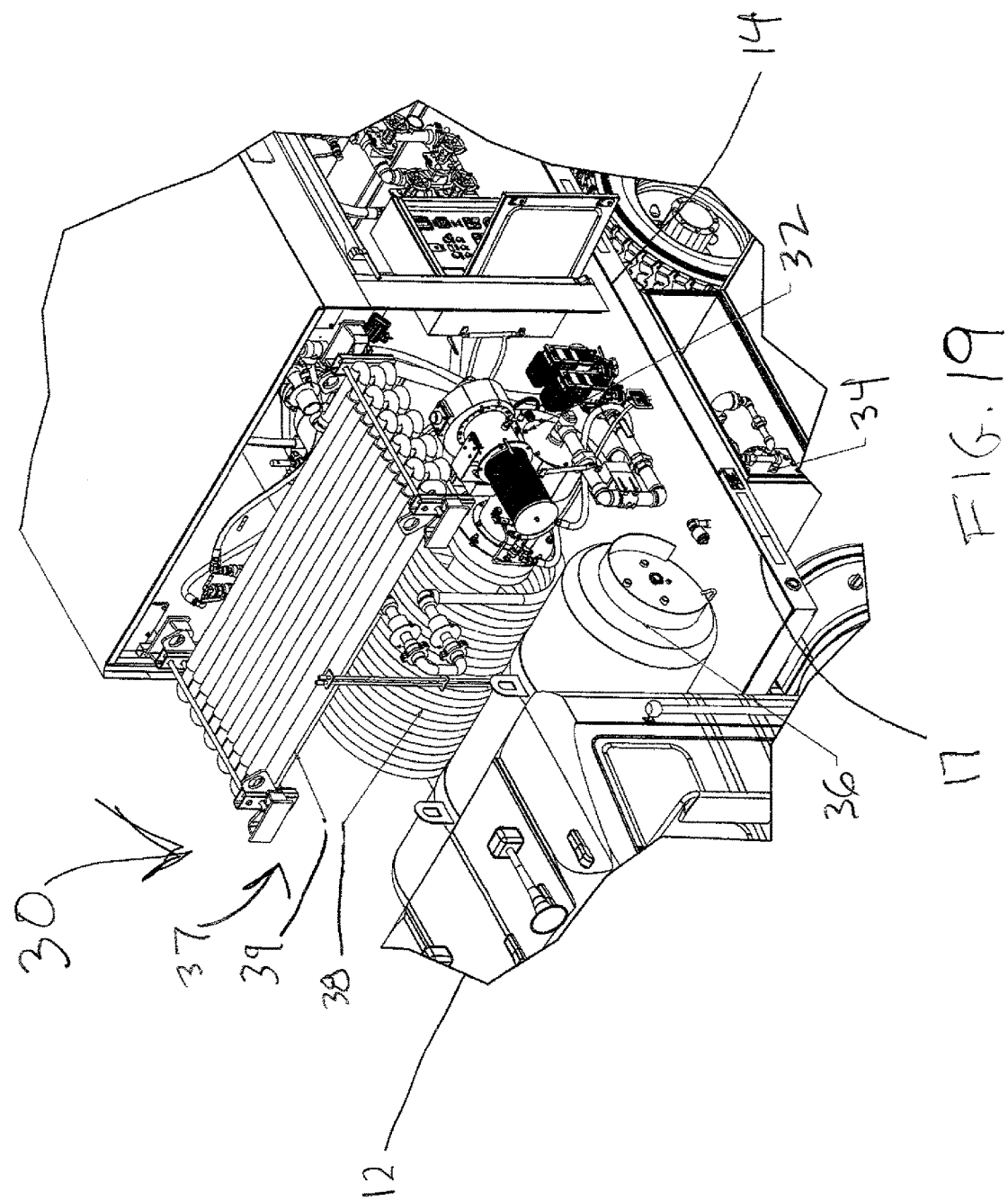
FIG. 19 depicts a breakaway perspective view of an exemplary embodiment of the burner system.

In an exemplary embodiment referring to FIG. 19, a burner system 30 may be mounted at the front portion 17 of the bed 14. The burner system 30 generally has a burner 32, a vaporizer 34, a supply tank 36, and a heat exchanger system 37 generally including a first heat exchanger 38, plus a second heat exchanger 39. The burner 32 may, for example, be a 4.2 MBTU low NOx burner 32 for providing heat to the heat exchanger system 37. The vaporizer 34 may, for example, be a liquid propane vaporizer 34 to provide gaseous propane to the burner 32. The supply tank 36 may, for example, be a liquid propane supply tank 36 for supplying propane to the burner 32. The heat exchanger system 37 generally includes the first heat exchanger 38 as a helical heat exchanger, plus the second heat exchanger 39 as an economizer. The heat exchanger system 37 is used in the creation of steam.

Figure 20:
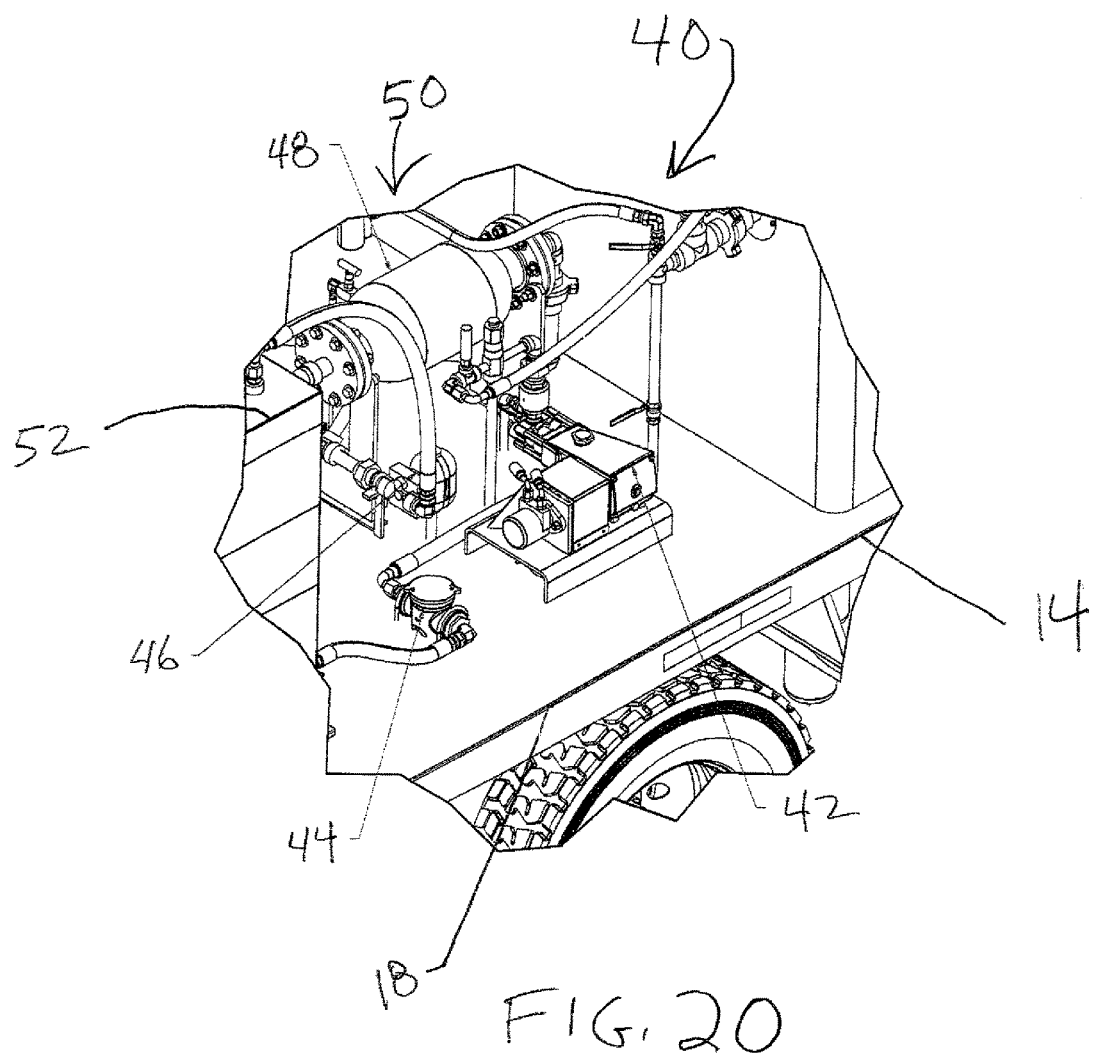
FIG. 20 depicts a breakaway perspective view of an exemplary embodiment of the pumping system.

In an exemplary embodiment referring to FIG. 20, a pumping system 40 may be mounted proximate a mid-portion or sub frame 18 of the bed 14. The pumping system 40 generally includes a water pump 42, a strainer 44, a steam trap 46 and a steam separator 48. The water pump 42 is preferably a high pressure water pump to, in one exemplary embodiment, supply water to the coil or heat exchangers 38 & 39 at six gallons-per-minute at 850 rotations-per-minute (such as, for example, a high pressure water pump sold under the brand CAT PUMPS). The strainer 44 is in line with the pump 42 and in one example is a basket strainer used to remove debris for water. The steam trap 46 is in line with the steam separator 48 and is used to collect condensate from the steam separator 48 and return to the water supply tank 52. The steam separator 48 aids in removing water particles from the steam in order to provide relatively dryer steam to and during the CIPP liner curing process.

In an exemplary embodiment referring to FIG. 21, a steam separator system 50 may be mounted proximate the mid-portion or sub frame 18 of the bed 14. The steam separator system 50 generally includes the steam separator 48, a water supply tank 52, a steam throttle valve 53, a steam bypass valve 54, a steam discharge valve 55, a tank return valve 56, and a control station 58. The water supply tank 52 is in line with the steam trap 46 at an outlet 52a and in line with the tank return valve 56 at the inlet 52b. The water supply tank 52 may, for example, supply fresh water with a capacity of 750 gallons. The steam throttle valve 53 allows steam to enter in order to create an air steam mixture. The steam bypass valve 54 is in line with and aids the steam throttle valve 53 to bypass excess steam to atmosphere. The steam discharge valve 55 is in line with the steam bypass valve 54 and the steam separator 48, and allows steam to enter into a steam separator 48 manifold 49. The tank return valve 56 is in line with the steam discharge valve 55 and is used in a pre-steam process to cycle water until sufficient temperatures are reached for the creation of steam. The control station 58 is generally a control station 58 for operation of the unit 10 for CIPP processes.

Figure 22:
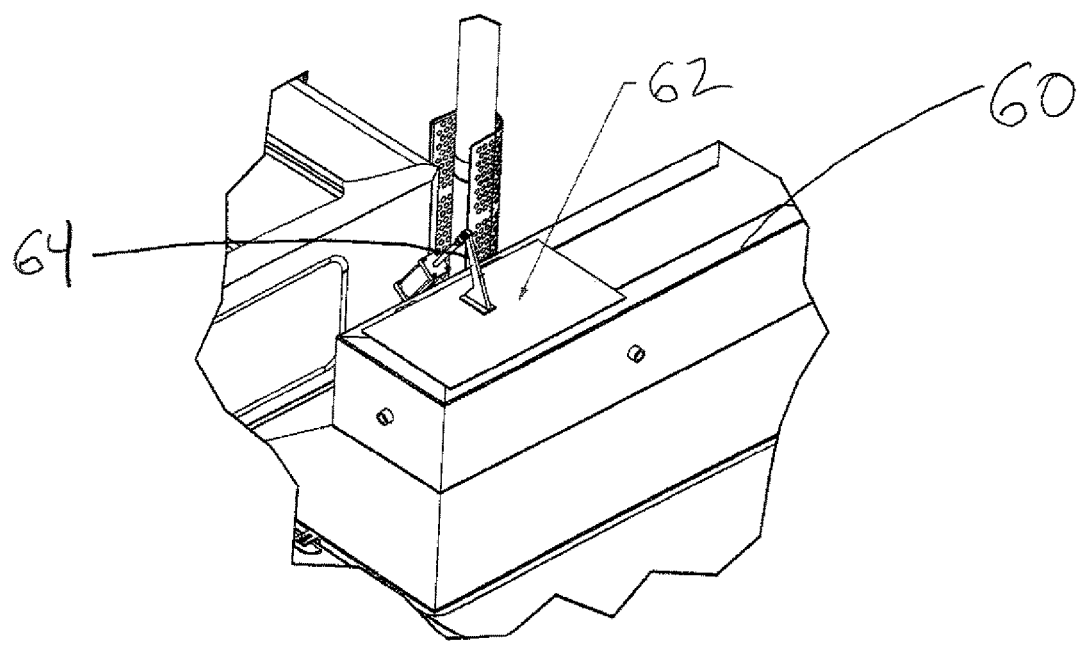
FIG. 22 depicts a breakaway perspective view of an exemplary embodiment of the firebox.

In an exemplary embodiment referring to FIG. 22, a firebox 60 may be mounted proximate and above the burner 32 and/or burner system 30. The firebox 60 may include an exhaust lid 62. The exhaust lid 62 is for use when the CIPP unit 10 is not in operation to keep debris out of the firebox 60. The exhaust lid 62 may include a hinged arm 64 for selective opening and closing of the exhaust lid 62.

Figure 23:
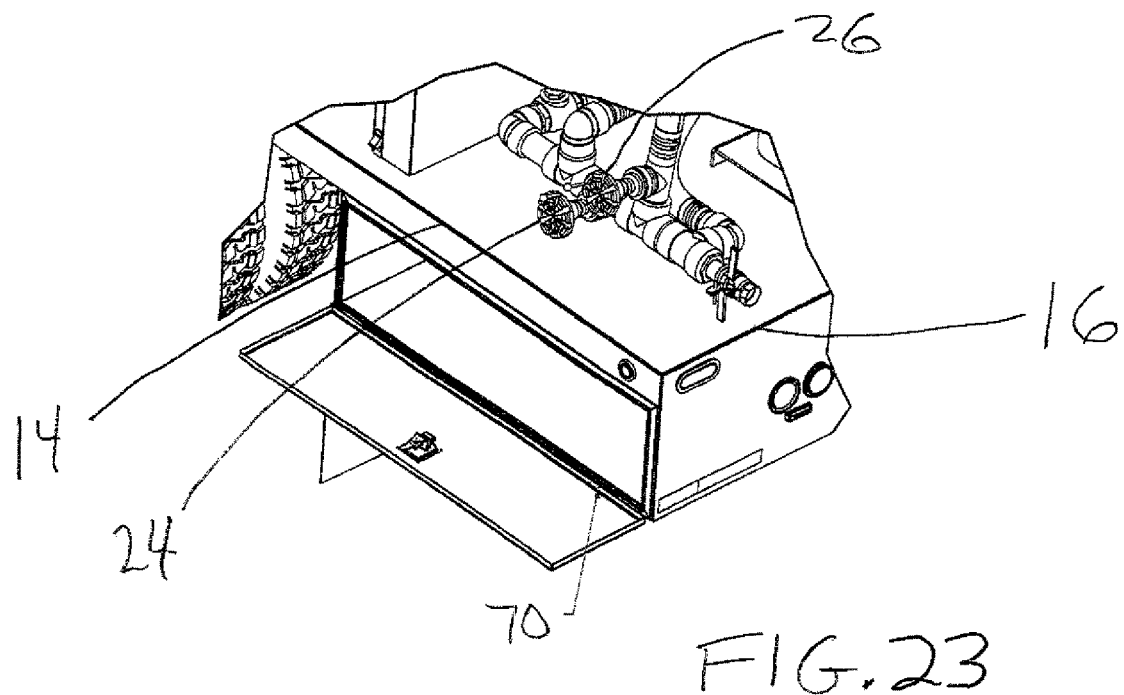
FIG. 23 depicts a breakaway perspective view of an exemplary embodiment of a toolbox.

In an exemplary embodiment referring to FIG. 23, toolbox(es) 70 may be mounted in one or more locations around or proximate the bed 14. The toolbox(es) 70 is/are mounted around the unit 10 to provide storage space for various tools needed for helpful for operation of the unit 10.

Figure 24:
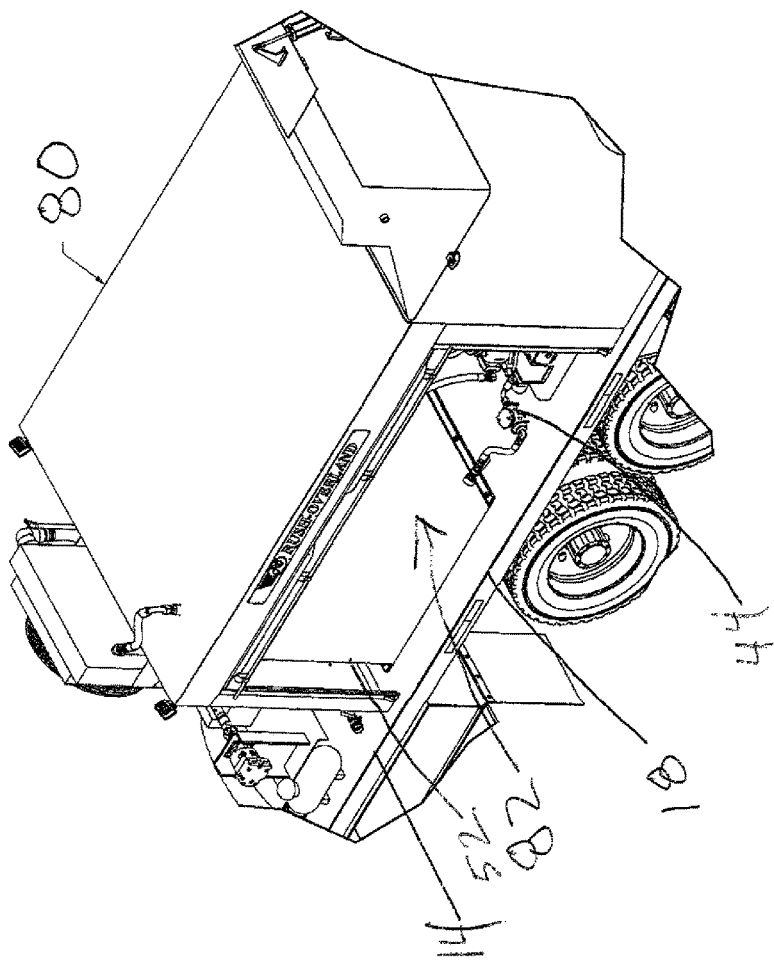
FIG. 24 depicts a breakaway perspective view of an exemplary embodiment of the manifold enclosure.

In an exemplary embodiment referring to FIG. 24, a manifold enclosure 80 may be mounted above and proximate the manifold 82 (or the pumping system 40 and the steam separator system 50) and generally above the mid-portion 18 of the bed 14. The manifold enclosure 80 keeps debris off of the manifold 82.

Figure 25:
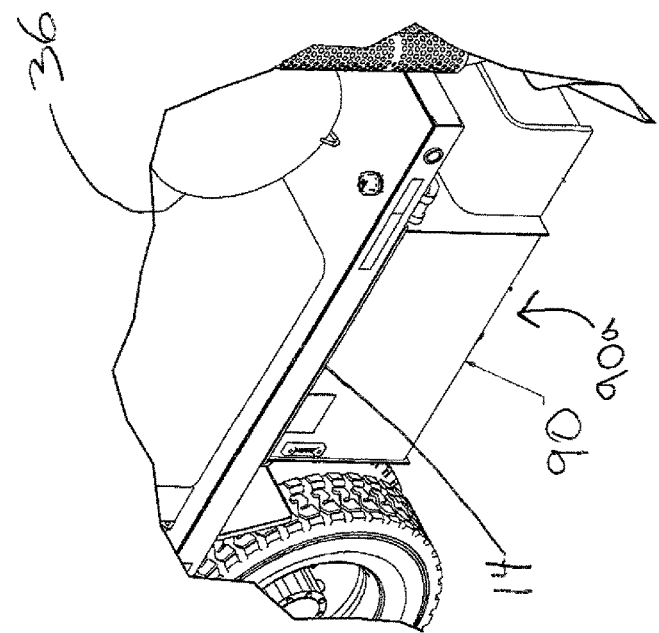
FIG. 25 depicts a breakaway perspective view of an exemplary embodiment of the hydraulic reservoir.

In an exemplary embodiment referring to FIG. 25, a power system as a hydraulic reservoir or tank 90 (or electrical system 90a) may be mounted to the bed 14 and beneath it. The hydraulic reservoir 90 is used for containing and maintaining optimal hydraulic fluid operating temperatures for operation of hydraulically powered features of the unit 10.

In an exemplary embodiment referring to FIG. 26 which relates to FIG. 22, a burner chamber system 100 is mounted proximate and around the burner 32 and/or burner system 30 above the bed 14. The burner chamber system 100 includes a burner chamber 102, an air cylinder 104 and a burner chamber top 106. The burner chamber 102 is used to container burner flame around the burner system 30 including the burner 32 and the heat exchanger system 37. The air cylinder 104 is used to open the burner chamber lid or exhaust lid 62 from the firebox 60 during operations. The air cylinder 104 is part the hinged arm 64 for selective opening and closing of the exhaust lid 62. The burner chamber top 106 is part of the firebox 60 and is used to relieve the system of exhaust gasses and maintain slight backpressure on the burner 32 for optimal firing conditions.

While the exemplary embodiments are described with reference to various implementations and exploitations, it will be understood that these exemplary embodiments are illustrative and that the scope of the inventive subject matter is not limited to them. Many variations, modifications, additions and improvements are possible. By way of example, the low NOx burner 32 and system may be implemented on a hot oil vehicle system (i.e. with steam medium being replaced by hot oil or other medium) for use by way of example as a 'hot oil' vehicle mounted low NOx unit in the oilfield industry.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. An apparatus for installation and curing of cured-in-place pipe, comprising:
   a unitary apparatus mounted as a vehicle, further comprising:
   a pressurization system mounted on the vehicle for pressurizing the cured-in-place pipe, wherein the pressurization system comprises a low pressure-high volume blower system;
   a low-NOx burner system mounted on the vehicle to provide heat to a heat exchange system;
   a pumping system mounted on the vehicle for providing a volume of water to the heat exchange system;
   a power system mounted to the vehicle;
   a burner chamber system mounted on the vehicle to contain the low-NOx burner system; and
   a steam separator system mounted on the vehicle.

2. The apparatus according to claim 1, further comprising a toolbox mounted on the vehicle.

3. The apparatus according to claim 1, further comprising a manifold enclosure mounted on the vehicle.

4. The apparatus according to claim 1, wherein the power system comprises a hydraulic reservoir.

5. The apparatus according to claim 1, wherein the power system comprises an electrical system.

6. The apparatus according to claim 1, wherein the power system comprises a motor driven system.

7. An apparatus for installation and curing of cured-in-place pipe, comprising:
   a unitary apparatus mounted as a vehicle, further comprising:
   a low pressure-high volume blower system mounted on the vehicle, for pressurizing the cured-in-place pipe;
   a low-NOx burner system mounted on the vehicle to provide heat to a heat exchange system;
   a pumping system mounted on the vehicle for providing a volume of water to the heat exchange system;
   a steam separator system mounted on the vehicle;
   a manifold enclosure mounted on the vehicle;
   a power system mounted to the vehicle; and
   a burner chamber system mounted on the vehicle to contain the low-NOx burner system.

8. The apparatus according to claim 7, further comprising a toolbox mounted on the vehicle.

9. The apparatus according to claim 7, wherein the power system comprises a hydraulic reservoir.

10. The apparatus according to claim 7, wherein the power system comprises an electrical system.

11. The apparatus according to claim 7, wherein the power system comprises a motor driven system.

12. A method for installation and curing of cured-in-place pipe, comprising the steps of:
   providing a unitary apparatus mounted as a vehicle;
   pressurizing the cured-in-place pipe from the vehicle;
   providing heat to a heat exchange system using a low-NOx burner system mounted on the vehicle;
   pumping water to the heat exchange system mounted on the vehicle;
   supplying water from a reservoir mounted to the vehicle; and
   containing the low-NOx burner system by providing a burner chamber system mounted on the vehicle.

13. The method according to claim 12 wherein said step of pressurizing the cured-in-place pipe is carried out by providing a low pressure-high volume blower system mounted on the vehicle.

14. The method according to claim 12, further comprising the step of separating a first volume of steam created by heat and water on the vehicle.

15. The method according to claim 14, wherein the step of separating a first volume of steam comprises the step of removing water particles from the first volume of steam and providing a second volume of steam to the cured-in-place pipe, wherein the second volume of steam is dryer than the first volume of steam.

16. The method according to claim 12, further comprising the step of supplying a volume of 750 cubic-foot-per-minute air to the cured-in-place pipe.

* * * * *